US009465351B2

(12) United States Patent
Miller et al.

(10) Patent No.: US 9,465,351 B2
(45) Date of Patent: Oct. 11, 2016

(54) SELF-TRANSFORMING IMAGING CARTRIDGE CHIP

(76) Inventors: Steven Miller, Pinellas Park, FL (US); Herman Schnell, Coral Springs, FL (US)

( * ) Notice: Subject to any disclaimer, the term of this patent is extended or adjusted under 35 U.S.C. 154(b) by 1021 days.

(21) Appl. No.: 13/167,656

(22) Filed: Jun. 23, 2011

(65) Prior Publication Data

US 2012/0327455 A1 Dec. 27, 2012

(51) Int. Cl.

*G06K 15/02* (2006.01)
*G06F 3/12* (2006.01)
*G03G 21/16* (2006.01)
*G03G 15/00* (2006.01)

(52) U.S. Cl.

CPC .......... *G03G 21/1676* (2013.01); *G03G 15/55* (2013.01); *G03G 15/553* (2013.01); *G03G 2221/1663* (2013.01); *G03G 2221/1823* (2013.01)

(58) Field of Classification Search

None
See application file for complete search history.

(56) References Cited

U.S. PATENT DOCUMENTS 5,995,774 A * 11/1999 Applegate et al. ............ 399/27
6,158,850 A * 12/2000 Cook .............................. 347/85
6,167,483 A * 12/2000 Miyauchi ...................... 711/103
6,533,383 B1 * 3/2003 Saruta et al. .................. 347/19
6,701,096 B2 * 3/2004 Arai et al. ...................... 399/12
7,020,414 B2 * 3/2006 Ito et al. ....................... 399/109
7,509,062 B2 * 3/2009 Kikuchi et al. ................ 399/24
7,599,247 B2 * 10/2009 Asauchi ....................... 365/239
8,602,536 B1 * 12/2013 Sarnoff et al. ................. 347/85
2002/0122672 A1 * 9/2002 Sasago et al. ................. 399/12
2004/0125165 A1 * 7/2004 Croley et al. .................. 347/19
2004/0223781 A1 * 11/2004 Ito et al. ....................... 399/109
2005/0163514 A1 * 7/2005 Hwang ............................ 399/8
2007/0120860 A1 * 5/2007 Fredlund et al. ............. 345/503
2007/0223942 A1 * 9/2007 Miller ............................ 399/12
2008/0013966 A1 * 1/2008 Watanabe et al. ............. 399/12
2008/0050129 A1 * 2/2008 Clarke et al. .................. 399/12
2008/0095554 A1 * 4/2008 Katogi et al. ................. 399/263
2008/0273883 A1 * 11/2008 Kim et al. ...................... 399/12
2009/0073492 A1 * 3/2009 Okabe .......................... 358/1.16
2009/0112738 A1 * 4/2009 Nagata ........................... 705/28
2010/0259579 A1 * 10/2010 Wu ................................ 347/29
2012/0327451 A1 * 12/2012 Miller et al. ................. 358/1.14

* cited by examiner

*Primary Examiner* — Beniyam Menberu
(74) *Attorney, Agent, or Firm* — Jesse Delcamp

(57) ABSTRACT

An electronic circuit for use with a consumable imaging unit comprises information configured to transform said electronic circuit from a communicated state to a non communicated state. Additionally, the information of the circuit is configured to alter an identifier of the circuit. The information of the circuit is also configured to point an imaging machine to communicate with a second element of the circuit after the information determines that a first element of the circuit has been altered from its original state.

22 Claims, 14 Drawing Sheets

SELF-TRANSFORMING IMAGING CARTRIDGE CHIP

CROSS REFERENCE TO RELATED APPLICATIONS

Background of the Invention

The present invention relates to an imaging cartridge adapted to fit within an imaging cartridge-receiving cavity of an imaging machine.

There are many different types of imaging cartridges, including toner cartridges, inkjet cartridge, cartridges for 3D printers, etc. that print using several different types of printable material including, toner, ink, plastic filament, etc. Each type of cartridge comprises one or more consumable imaging units. For example a toner cartridge typically comprises a hopper unit and wastebin unit, but may also comprise a photoconductive drum unit, or other units. Additionally, the imaging cartridge itself is a consumable imaging unit. The consumable imaging units comprise different imaging components, for example the wastebin unit of a toner cartridge typically comprises a photoconductive drum, and the hopper unit typically comprises a developer roller. The photoconductive drum rotates opposite the developer roller, the developer roller being in fluid contact with toner. The toner is transferred to paper, or other medium, as it passes by the rotating photoconductive drum. Subsequently, the paper is heated so that the toner is melted thereby permanently affixing the toner to the paper.

Most Original Equipment Manufacturers (OEMs) design their imaging machines to accept imaging cartridges manufactured by them and to reject the imaging cartridges manufactured by others. More particularly, to increase sales of their own imaging cartridges, imaging machine manufacturers have added electronic identification features to the imaging machines and to the imaging cartridges that do not enhance the functional performance of the imaging machine in any way but which serve to prevent use of a competitor's imaging cartridge in the imaging machine. Imaging machine manufacturers also prefer to sell new imaging cartridges to replace empty imaging cartridges. Therefore, they do not support the re-cycling industry.

Specifically, OEMs have attempted to prevent re-cycling of imaging cartridges by installing single-use electronic circuits on the cartridges. These single-use electronic circuits (sometimes called "cartridge chips," "printer chips," or simply "chips") are required to activate the imaging machine, allowing interoperation between the imaging machine and the imaging cartridge. Once the electronic circuit reaches the end of its life, the imaging machine will no longer accept the electronic circuit. Therefore, in order to re-use the imaging cartridge, a new electronic circuit must be installed on the cartridge.

In addition to activating the imaging machine, the electronic circuit keeps track of the status of characteristics of the imaging cartridge that change throughout the life of the cartridge and communicate the status to the imaging machine. Examples of cartridge characteristics that change throughout the life of the cartridge include, but are not limited to the number of pages the imaging cartridge has printed, the amount of printable material remaining in the imaging cartridge, the number of rotations the cartridge's photoconductive drum has performed, and the time that has elapsed between two events.

Additionally, many of the cartridge characteristics of the prior art do not change throughout the life of the cartridge such as the printable material color, the type of printable material (ink, plastic filament, toner, MICR toner) and an identifier (identifier types include a serial number, MAC, ROM ID, emulation of a ROM ID, or any other aspect of the cartridge that identifies the cartridge) that identifies the electronic circuit. It should be noted that prior art cartridges contain one or more types of identifiers.

OEM electronic circuits use proprietary hardware that communicates with the imaging machine. However, manufacturers of aftermarket electronic circuits cannot obtain the OEMs proprietary hardware; therefore aftermarket electronic circuits must comprise a memory unit which contains information that the electronic circuit uses to mimic the communications sent from the OEM electronic circuit to the imaging machine in order to activate the imaging machine. In addition to the memory unit, some electronic circuits comprise other units, such as a processing unit, arithmetic unit, input/output unit, or a power unit.

During the manufacturing process, the memory unit is loaded with the information which comprises different elements, each element being associated with a different feature of the electronic circuit. For example, an electronic circuit may have elements that are associated with cartridge characteristics such as a page count indicating the number of pages the imaging cartridge has printed, a printable material indicator indicating the amount of printable material remaining in the imaging cartridge, a drum rotation count indicating the number of rotations the cartridge's photoconductive drum has performed, a timer that indicates elapsed time between two events, a temperature measuring device that indicates temperature of the cartridge, an identifier that identifies the electronic circuit, among other stored information.

For each cartridge characteristic (regardless of whether the characteristic changes throughout the life of the cartridge) there is an element of the electronic circuit that is associated with the characteristic. For cartridge characteristics whose status changes throughout the life of the cartridge, the element associated with each characteristic keeps track of the status of the characteristic and this status information is periodically communicated to the imaging machine. Additionally, some electronic circuits comprise the element of a software program that controls the functions of the electronic circuit.

Aftermarket electronic circuits need power to operate. Most electronic circuits receive the power they need to operate from the imaging machine. Throughout standard interoperation between an electronic circuit and an imaging machine, the electronic circuit is sometimes receiving power from the imaging machine and other times the electronic circuit is not receiving power from the imaging machine. When power is being supplied to the electronic circuit from the imaging machine, the electronic circuit powers up in order to communicate with the imaging machine, when power is not being supplied to the circuit from the imaging machine, the circuit powers down. Also, to conserve power, the electronic circuit has the ability to transform itself to a sleep mode that requires less power than normal to operate the circuit. When the circuit wakes up from sleep mode, the circuit again requires full power to operate.

An electronic circuit that has been loaded with information, but has never communicated with any imaging machine exists in its original, "non-communicated," state, and each element of the electronic circuit is also in its original, non-communicated, state, in which an imaging machine for which the electronic circuit is intended for use will recognize that the electronic circuit has never previously communicated with any imaging machine. When the imaging cartridge is inserted into the imaging machine, the electronic circuit enters into communication with the imaging machine and must first be accepted by the imaging machine before the imaging machine will begin interoperation between the circuit and the imaging machine. In order for the imaging machine to accept the electronic circuit, the electronic circuit must first authenticate itself to the imaging machine, to show that the electronic circuit is a valid circuit. If the electronic circuit does not correctly authenticate itself to the imaging machine, the imaging machine will reject the circuit.

Once the electronic circuit has been accepted by the imaging machine, the electronic circuit and the imaging machine undergo a series of communications for interoperation. When the imaging machine requests information from the electronic circuit, the electronic circuit points the imaging machine to different elements of the information on the circuit in order to communicate the correct information to the imaging machine.

As the imaging cartridge prints, certain elements of the electronic circuit keep track of the status of the corresponding characteristics of the cartridge. As the status of a cartridge characteristic changes, the element of the electronic circuit that tracks the status of the characteristic is altered to indicate the updated status of the characteristic.

Once the element has been altered from its original state, the imaging machine is able to recognize the altered state of the element as indicating that the electronic circuit has communicated with an imaging machine. At this point the electronic circuit has been put into a "communicated" state, indicating that the electronic circuit has communicated with an imaging machine.

When the electronic circuit points the imaging machine to communicate with an element of the electronic circuit regarding the status of a cartridge characteristic, the imaging machine checks the element (to which it has been pointed) to see if the element has set a pre-determined usable life for any of the characteristics of the cartridge. A pre-determined usable life limits the actual life that the characteristic is able to achieve before the electronic circuit indicates to the imaging machine that the pre-determined usable life has been reached and the imaging machine is triggered to reject the circuit. The pre-determined useable life of a characteristic is different from the actual life of the characteristic in that the actual life of a characteristic is the extent of life actually achieved, while the pre-determined usable life is a theoretical, pre-set, life intending to limit the actual life that the characteristic achieves. The first time an electronic circuit communicates a pre-determined usable life of a characteristic to an imaging machine, the imaging machine recognizes the extent of the pre-determined life to be the initial extent for the specific circuit.

For example, when an electronic circuit enters into communication with an imaging machine, the imaging machine reads an element of the circuit that contains a page count to determine the initial extent of the pre-determined life of the page count. In this example, the element has set a pre-determined usable life of the page count at 30,000 pages. As the cartridge prints, the element that keeps track of the page count of the cartridge is altered to indicate the number of pages the cartridge has printed. Each page that the cartridge prints depletes the pre-determined useable life of the page count stored in the element. Since the element associated with the page count characteristic has set a pre-determined useable life with an initial extent of 30,000 printed pages, then once the cartridge prints 30,000 pages, the element of the electronic circuit will indicate that the pre-determined useable life of the page count has been reached and the imaging machine will reject the electronic circuit.

Electronic circuits set pre-determined usable lives for cartridge characteristics for several reasons. One reason is that some imaging machines will only accept an electronic circuit if the circuit sets a pre-determined limit to the life that a characteristic is allowed to achieve, i.e. the imaging machine requires that an electronic circuit only allows the cartridge to print a limited number of pages before the electronic circuit notifies the imaging machine that the page count has reached the pre-determined life and the imaging machine is triggered to reject the electronic circuit. OEMs incorporated this feature into their imaging machines to limit the life of the cartridges so that the end user will use cartridges more quickly and have to purchase more cartridges. Additionally, some imaging machines require that very specific usable lives are set for certain characteristics. For example, some imaging machines will only accept electronic circuits that have pre-determined usable lives of 3,000 or 6,000 pages.

Therefore, it would be beneficial to have a cartridge that can achieve an actual life that extends beyond the pre-determined useable life of a traditional cartridge. Thus there is a need for an electronic circuit that can extend the actual life of an imaging cartridge.

The electronic circuit also has additional features, other than the initial authentication requirement, that will cause the circuit to be rejected by the imaging machine. In one example, the imaging machine and electronic circuit have locking features that "marry" the circuit to the specific imaging machine. A circuit that is married to an imaging machine will only operate with the specific imaging machine to which it is married. If a circuit that is married to a first imaging machine is then entered into communication with a second imaging machine, the lockout features of the second imaging machine and the circuit will cause the second imaging machine to reject the electronic circuit.

The process of marrying an electronic circuit to an imaging machine typically comprises storing an identifying feature of the electronic circuit in the imaging machine's memory and also altering the electronic circuit to put the circuit into a communicated state. One method that OEMs use to marry electronic circuits to imaging machines includes the following.

When a non-communicated electronic circuit communicates with an imaging machine for a first time, two important actions are performed: 1) the imaging machine writes to the data of the circuit to indicate that the circuit is now in a communicated state; and 2) the imaging machine stores in its memory, an identifier of the circuit.

The imaging machines in this example are designed to only interoperate with an electronic circuit if one of the following two conditions is met: 1) the circuit is in a non-communicated state; or 2) the circuit's identifier has been stored in the imaging machine's memory.

Therefore, the imaging machine will only operate with an electronic circuit that is in a communicated state if the identifier of the circuit is stored in the imaging machine's memory. Additionally, since the imaging machine only stores the identifier of non-communicated circuits in its memory, once the electronic circuit has been written to as being in a communicated state, no other imaging machine will store the circuit's identifier, and therefore the circuit can only be used in the specific imaging machine that has already stored the circuit's identifier. Also, if the imaging machine has stored an identifier of multiple electronic circuits, the imaging machine will only accept the circuit having the most recently stored identifier.

For example, once an electronic circuit communicates with a first imaging machine and the circuit is written to as being in a communicated state, if the circuit is removed from the first imaging machine and inserted into a second imaging machine, the second imaging machine will recognize that the electronic circuit is in a communicated state, and the second imaging machine will not accept the circuit. Only the first imaging machine that has stored the circuit's identifier will accept and interoperate with the communicated circuit.

The first imaging machine will continue to interoperate with the communicated electronic circuit until a second electronic circuit, in a non-communicated state, enters into communication with the imaging machine. When the second circuit enters into communication with the imaging machine, the second circuit is written to as being communicated and the imaging machine stores the second circuit's identifier as the most recently stored identifier in the imaging machine's memory. Once this has been done, the imaging machine will only interoperate with the second circuit, and will no longer interoperate with the first circuit. The imaging machine will not interoperate with the first electronic circuit anymore because the imaging machine recognizes the first circuit has been written to as being in a communicated state and the first circuit's identifier is no longer stored as the most recent identifier in the imaging machine's memory.

This lockout feature of marrying an electronic circuit to an imaging machine presents a significant problem to aftermarket electronic circuit manufacturers because it prevents the circuits of the prior art from being tested in an imaging machine during the manufacturing process. This is because the process of testing the electronic circuit in the manufacturer's imaging machine will cause the circuit to be married to the manufacturer's imaging machine and the circuit will cease to operate in any imaging machine other than the manufacturer's imaging machine.

This is unacceptable for electronic circuit manufacturers because once a circuit is married to the manufacturer's imaging machine it won't be able to operate with an end user's imaging machine. As a result, prior art electronic circuits cannot be tested by the manufacturer and therefore there is an extremely high defect rate for prior art electronic circuits. Additionally, for the reason described above, resellers of imaging cartridges are also not able to test cartridges before sending them to their customers and therefore they experience the same high defect rate as the aftermarket electronic circuit manufacturers.

Thus, there is a need for an electronic circuit having the ability to un-marry an imaging machine to which the circuit has previously been married. When an electronic circuit becomes un-married to an imaging machine, the electronic circuit will be able to operate with other imaging machines.

In another example, the imaging machine and electronic circuit have a locking feature that prevents using a first imaging cartridge in an imaging machine, then using a second imaging cartridge in the imaging machine, and then using the first imaging cartridge in the imaging machine again. When the electronic circuit is entered into communication with an imaging machine, certain imaging machines store the identifier of all of the electronic circuits that have communicated with the imaging machine and the imaging machine will only interoperate with the electronic circuit comprising the most recent identifier on its list. Therefore, once a first circuit's identifier has been stored in an imaging machine, if a second electronic circuit is entered into communication with an imaging machine, the imaging machine will store the second circuit's identifier as the most recent identifier and will no longer accept the first circuit because the first circuit's identifier is in an older position on the list. Therefore, the first electronic circuit must change its identifier in order to be accepted by the imaging machine again.

This presents a problem to companies that print checks in addition to printing regular documents. Checks must be printed using expensive Magnetic Ink Character Recognition (MICR) imaging cartridges, while regular documents can be printed with lower cost standard imaging cartridges. Therefore, a company may choose to print regular documents with a standard cartridge, and then when a check needs to be printed, remove the standard cartridge and use a MICR cartridge to print the check. Once the check is printed, the MICR cartridge is removed from the imaging machine and the standard cartridge is used again. However, once the MICR cartridge is used in the imaging machine, the locking feature described above prevents the standard cartridge from being used in the imaging machine again. Therefore, there is a need for an electronic circuit that will not be rejected by an imaging machine in the above situation.

In another scenario, the imaging machine and electronic circuit have a locking feature that prevents the imaging cartridge from being reused. As explained above, during operation, the electronic circuit stores information related to the status of the imaging cartridge and this information is communicated to the imaging machine. The imaging machine periodically checks to makes sure that the status information of the cartridge progresses. For example, once the electronic circuit communicates the cartridge's page count to the imaging machine, the imaging machine checks to makes sure that at a future time, the page count of the cartridge has not decreased. If the imaging machine receives information that the page count of the cartridge has decreased, then the imaging machine knows that the electronic circuit has been altered to increase the life of the cartridge and the imaging machine will reject the electronic circuit.

In another example, once the electronic circuit has communicated to the imaging machine the amount of printable material remaining in the cartridge, the imaging machine checks to make sure that at a future time, the level of remaining printable material communicated by the electronic circuit has not increased. If the level of printable material has increased, the imaging machine knows that the cartridge has been refilled and the imaging machine will reject the electronic circuit.

This lockout feature preventing the reuse of an imaging cartridge presents a problem to the imaging cartridge recycling industry. Since an imaging machine will not accept an electronic circuit in which the printable material level has increased, once the printable material indicator of an electronic circuit indicates that the cartridge has depleted a portion of its printable material, in order to refill the imaging cartridge with printable material the electronic circuit must be removed from the cartridge and a new electronic circuit must be installed on the cartridge. Thus there is a need for a single electronic circuit that allows the imaging cartridge to be refilled.

An important segment of the printing industry that is affected by this lockout feature is the cost-per-page segment. The cost-per-page segment charges a consumer a fee for each page the consumer prints. Since the cost of the printable material stored in an imaging cartridge comprises a small percentage of the total cost of manufacturing the cartridge, the more pages a cartridge can print, the lower total cost per printed page. Therefore, companies that rely on cost-per-page programs would greatly benefit from an imaging cartridge that had the ability to print more pages than a traditional cartridge, but only cost slightly more to manufacture. However, some imaging machines will only accept electronic circuits that have a specific total page count limit. If this limit is increased in an attempt to increase the printable page yield of a cartridge, the imaging machine will reject the electronic circuit. Therefore, there is a need for an electronic circuit that enables an imaging cartridge to print more pages than a traditional yield.

Imaging machines also contain a lockout feature to prevent cloned circuits from being used in the imaging machine. A clone of an electronic circuit has the same identifier as the circuit from which it was cloned. In order to prevent the use of cloned circuits with an imaging machine, the imaging machine will not operate with an electronic circuit that is in a non-communicated state if the circuit's identifier has already been stored in the imaging machine's memory, because this indicates that the imaging machine has already operated with a circuit having the same identifier and therefore the new, non-communicated, electronic circuit must be a clone of the previous circuit.

This presents an additional problem to aftermarket electronic circuit manufacturers, because in order to develop an aftermarket electronic circuit that is not a clone of a previous circuit, the aftermarket electronic circuit manufacturer must be able to manufacture electronic circuits that each have different identifiers. The problem is that this process is extremely complicated and therefore it is easier for aftermarket electronic circuit manufacturers to make clones of existing electronic circuits. However, the lockout feature described above allows the imaging machine to recognize cloned electronic circuits and reject them. Thus there is a need for a cloned electronic circuit that will not be rejected by an imaging machine.

SUMMARY OF THE INVENTION

The long-standing but heretofore unfulfilled need for an electronic circuit that can un-marry a printer to which it had previously been married and that also includes additional improvements that overcome the limitations of prior art electronic circuits is now met by a new, useful, and nonobvious invention.

In a first embodiment a method of operating an electronic circuit for use with a consumable imaging unit comprises the steps of: providing an electronic circuit adapted to communicate with an imaging machine, the electronic circuit transforming itself to a non-communicated state from a communicated state. The electronic circuit is provided in a state where a second imaging machine recognizes that the electronic circuit has communicated with a first imaging machine, and therefore the second imaging machine will not accept the electronic circuit. The electronic circuit then alters itself to be in a non-communicated state, so that the second imaging machine recognizes the electronic circuit as not having communicated with the first imaging machine. As a result, the second imaging machine will accept the electronic circuit as being new, and will not reject the electronic circuit as having previously communicated with another imaging machine. In another example, the memory unit of the circuit comprises information configured to transform said electronic circuit from a communicated state to a non-communicated state.

In a sub-embodiment, the step of the electronic circuit transforming itself to a non-communicated state comprises altering the information in the electronic circuit. In this embodiment, the information stored in the memory of the electronic circuit contributes in indicating that the electronic circuit has communicated with the first imaging machine. Therefore, the electronic circuit alters the information stored in its memory so that the second imaging machine recognizes the electronic circuit as not having communicated with the first imaging machine.

In an additional sub-embodiment, the step of altering the information in the electronic circuit comprises altering the data in the electronic circuit. In this embodiment, the data stored in the memory of the electronic circuit contributes in indicating that the electronic circuit has communicated with the first imaging machine. Therefore, the electronic circuit alters the data stored in its memory so that the second imaging machine recognizes the electronic circuit as not having communicated with the first imaging machine.

In an additional sub-embodiment, the step of altering the data comprises changing the value of a bit of the data. In this embodiment, a bit of the data stored in the memory of the electronic circuit contributes in indicating that the electronic circuit has communicated with the first imaging machine. Therefore, the electronic circuit changes the value of the bit so that the second imaging machine recognizes the electronic circuit as not having communicated with the first imaging machine.

In an additional sub-embodiment, the step of the electronic circuit transforming itself to a non-communicated state comprises altering the page count of the electronic circuit. In this embodiment, the page count stored in the memory of the electronic circuit contributes in indicating that the electronic circuit has communicated with the first imaging machine. Therefore, the electronic circuit alters the page count so that the second imaging machine recognizes the electronic circuit as not having communicated with the first imaging machine.

In an additional sub-embodiment, the step of the electronic circuit transforming itself to a non-communicated state comprises altering the printable material indicator of the electronic circuit. In this embodiment, the printable material indicator stored in the memory of the electronic circuit contributes in indicating that the electronic circuit has communicated with the first imaging machine. Therefore, the electronic circuit alters the printable material indicator so that the second imaging machine recognizes the electronic circuit as not having communicated with the first imaging machine.

In an additional sub-embodiment, the printable material level indicator indicates a measured printable material level or a calculated printable material level determined using a printed pixel count. In this embodiment, the printable material level indicator shows a printable material level that is determined by either measuring the level of printable material in the imaging cartridge or by determining the number of pixels the imaging cartridge has printed and calculating the remaining printable material level based on the initial amount of printable material in the cartridge minus the amount of printed pixels.

In an additional sub-embodiment, the step of the electronic circuit transforming itself to a non-communicated state comprises altering the drum rotation count of the electronic circuit. In this embodiment, the drum rotation count stored in the memory of the electronic circuit contributes in indicating that the electronic circuit has communicated with the first imaging machine. Therefore, the electronic circuit alters the drum rotation count so that the second imaging machine recognizes the electronic circuit as not having communicated with the first imaging machine.

In an additional sub-embodiment, the step of the electronic circuit transforming itself to a non-communicated state comprises altering the elapsed time value of the electronic circuit. In this embodiment, the elapsed time value stored in the memory of the electronic circuit contributes in indicating that the electronic circuit has communicated with the first imaging machine. Therefore, the electronic circuit alters the elapsed time value so that the second imaging machine recognizes the electronic circuit as not having communicated with the first imaging machine.

In an additional sub-embodiment, the electronic circuit transforms itself to a non-communicated state after a pre-determined event has occurred. In this embodiment, the electronic circuit stays in a communicated state until a pre-determined event occurs. Once the pre-determined event occurs, the electronic circuit is triggered to transform itself to a non-communicated state. This allows the electronic circuit to stay in a communicated state until it is desired that the electronic circuit transform itself.

In an additional sub-embodiment, the pre-determined event is the electronic circuit powering down, the electronic circuit powering up, the electronic circuit entering sleep mode, the electronic circuit waking from sleep mode, the electronic circuit reaching a pre-determined temperature, the electronic circuit communicating with a pre-determined number of imaging machines, the imaging cartridge having printed a pre-determined number of pages, a pre-determined amount of printable material being used, a pre-determined amount of time having elapsed, a pre-determined number of drum rotations, or the imaging machine having performed a pre-determined number of cycles with the electronic circuit. When any one of these predetermined events occurs, the electronic circuit is triggered to transform itself.

In an additional sub-embodiment, the electronic circuit ceases to transform itself to a non-communicated state after a pre-determined event has occurred. In this embodiment, once the pre-determined event occurs, the electronic circuit is triggered to not transform itself to a non-communicated state. This allows the electronic circuit to transform itself to a non-communicated state until the pre-determined event occurs, but once the pre-determined event occurs, the electronic circuit ceases to transform itself anymore.

In an additional sub-embodiment, the electronic circuit comprises an identifier having a value; and the electronic circuit changes the value of the identifier. In this embodiment, the electronic circuit also alters the value of its identifier so that the imaging machine will recognize the electronic circuit as a completely different electronic circuit. In one example, the circuit comprises a memory unit comprising information configured to alter said identifier.

In a second embodiment a method of operating an electronic circuit for use with a consumable imaging unit comprises the steps of: providing the electronic circuit adapted to communicate with an imaging machine; the electronic circuit comprising a pre-determined usable life and an actual life; the pre-determined usable life comprising an initial extent; the electronic circuit transforming itself to achieve an actual life that exceeds said initial extent of said pre-determined useable life. The electronic circuit comprises a pre-determined usable life and an actual life. The pre-determined usable life is pre-set before the electronic circuit ever communicates with an imaging machine and imposes a pre-set limit on the life of the electronic circuit. The actual life of the electronic circuit is the actual life the electronic circuit achieves before the imaging machine rejects the circuit. Prior art electronic circuits are designed so that the actual life of the electronic circuit cannot exceed the pre-determined usable life of the circuit, however, the electronic circuit of the present invention is able to transform itself to achieve an actual life beyond said initial extent of said pre-determined useable life.

In a sub-embodiment, the step of the electronic circuit transforming itself comprises altering the information in the electronic circuit. In this embodiment, the information stored in the memory of the electronic circuit contributes in indicating the pre-determined usable life of the electronic circuit. Therefore, the information stored in the memory of the circuit is altered in order for the electronic circuit to achieve an actual life that exceeds the pre-determined usable life of the electronic circuit.

In an additional sub-embodiment, the step of altering the information in the electronic circuit comprises altering the data in the electronic circuit. In this embodiment, the data stored in the memory of the electronic circuit contributes in indicating the pre-determined usable life of the electronic circuit. Therefore, the data stored in the memory of the circuit is altered in order for the electronic circuit to achieve an actual life that exceeds the pre-determined usable life of the electronic circuit.

In an additional sub-embodiment, the step of altering the data comprises changing the value of a bit of the data. In this embodiment, the data stored in the memory of the electronic circuit contributes in indicating the pre-determined usable life of the electronic circuit. Therefore, the value of a bit of the data stored in the memory of the circuit is altered in order for the electronic circuit to achieve an actual life that exceeds the pre-determined usable life of the electronic circuit.

In an additional sub-embodiment, the step of altering the information in the electronic circuit comprises altering the page count of the electronic circuit. In this embodiment, the page count stored in the memory of the electronic circuit contributes in indicating the pre-determined usable life of the electronic circuit. Therefore, the page count stored in the memory of the circuit is altered in order for the electronic circuit to achieve an actual life that exceeds the pre-determined usable life of the electronic circuit.

In an additional sub-embodiment, the step of altering the information in the electronic circuit comprises altering the printable material indicator of the electronic circuit. In this embodiment, the printable material indicator stored in the memory of the electronic circuit contributes in indicating the pre-determined usable life of the electronic circuit. Therefore, the printable material indicator stored in the memory of the circuit is altered in order for the electronic circuit to achieve an actual life that exceeds the pre-determined usable life of the electronic circuit.

In an additional sub-embodiment, the printable material indicator indicates a measured printable material amount or a calculated printable material amount determined using a printed pixel count. In this embodiment, the printable material indicator shows a printable material amount that is determined by either measuring the amount of printable material in the imaging cartridge or by determining the number of pixels the imaging cartridge has printed and calculating the remaining printable material amount based on the initial amount of printable material in the cartridge minus the amount of printed pixels.

In an additional sub-embodiment, the step of altering the information in the electronic circuit comprises altering the drum rotation count of the electronic circuit. In this embodiment, the drum rotation count stored in the memory of the electronic circuit contributes in indicating the pre-determined usable life of the electronic circuit. Therefore, the drum rotation count stored in the memory of the circuit is altered in order for the electronic circuit to achieve an actual life that exceeds the pre-determined usable life of the electronic circuit.

In an additional sub-embodiment, the step of altering the information in the electronic circuit comprises altering the elapsed time value. In this embodiment, the elapsed time value stored in the memory of the electronic circuit contributes in indicating the pre-determined usable life of the electronic circuit. Therefore, the elapsed time value stored in the memory of the circuit is altered in order for the electronic circuit to achieve an actual life that exceeds the pre-determined usable life of the electronic circuit.

In an additional sub-embodiment, the step of the altering the information in the electronic circuit comprises altering the identifier of the electronic circuit. In this embodiment, the identifier of the electronic circuit has been stored in the memory of the imaging machine along with information indicating that a portion of the pre-determined usable life of the electronic circuit has been depleted. As a result, the imaging machine is able to recognize the electronic circuit as having a portion of its pre-determined usable life depleted. Therefore, if information on the electronic circuit is altered, but the circuit's identifier stays the same, the imaging machine will think that the electronic circuit is a clone of itself and will reject the electronic circuit. Therefore, in order to transform the electronic circuit to achieve an actual life that exceeds the initial extent of the pre-determined usable life, the electronic circuit must change its identifier so that the imaging machine will recognize the electronic circuit as a completely different circuit.

In an additional sub-embodiment, the electronic circuit transforms itself after a pre-determined event has occurred. In this embodiment, the electronic circuit waits until a pre-determined event occurs until the electronic circuit transforms itself in order for the electronic circuit to achieve an actual life that exceeds the pre-determined usable life of the electronic circuit. If the pre-determined event never occurs, then the electronic circuit will never transform itself to achieve an actual life that exceeds the pre-determined usable life of the electronic circuit.

In an additional sub-embodiment, the pre-determined event is the electronic circuit powering down, the electronic circuit powering up, the electronic circuit entering sleep mode, the electronic circuit waking from sleep mode, the electronic circuit reaching a pre-determined temperature, the electronic circuit communicating with a pre-determined number of imaging machines, the imaging cartridge having printed a pre-determined number of pages, a pre-determined amount of printable material being used, a pre-determined amount of time having elapsed, a pre-determined number of drum rotations, or the imaging machine having performed a pre-determined number of cycles with the electronic circuit. When any one of these predetermined events occurs, the electronic circuit is triggered to transform itself.

In an additional sub-embodiment, the electronic circuit ceases to transform itself after a pre-determined event has occurred. In this embodiment, once the pre-determined event occurs, the electronic circuit is triggered to not transform itself in order for the electronic circuit to achieve an actual life that exceeds the pre-determined usable life of the electronic circuit. If the pre-determined event never occurs, then the electronic circuit is still able to transform itself to achieve an actual life that exceeds the pre-determined usable life of the electronic circuit.

In an additional sub-embodiment, the electronic circuit comprises an element; the element comprising an original state; the element being altered from its original state such that a portion of the pre-determined usable life is depleted; and the step of the electronic circuit transforming itself comprises the electronic circuit altering the element.

In an additional sub-embodiment, the consumable imaging unit comprises a characteristic; the characteristic comprises a status; the element is associated with the status of the characteristic; and the step of the electronic circuit altering the element comprises altering the element to a previous state, the previous state being independent of the status of the characteristic.

In a third embodiment a method of operating an electronic circuit for use with a consumable imaging unit comprises the steps of: providing the electronic circuit originally adapted to be accepted by an imaging machine; said electronic circuit transforming itself to a state where said electronic circuit is again adapted to be accepted by said imaging machine from a state where said electronic circuit is not accepted by said imaging machine. In this embodiment, the electronic circuit is provided in a state where the imaging machine will accept the electronic circuit. Then the electronic circuit is altered to a state where the imaging machine will not accept the electronic circuit. Then the electronic circuit transforms itself to a state where the imaging machine will again accept the circuit. In this embodiment, the electronic circuit is provided in a state where a second imaging machine recognizes that the electronic circuit has been married to a first imaging machine, and therefore the second imaging machine will not accept the electronic circuit. The electronic circuit then alters itself to no longer be married to said first imaging machine, so that the second imaging machine recognizes the electronic circuit as not being married to the first imaging machine. As a result, the second imaging machine will accept the electronic circuit, and will not reject the electronic circuit as being married to another imaging machine.

In a sub-embodiment, the step of the electronic circuit transforming itself to a state that the electronic circuit is again accepted by the imaging machine comprises altering the information in the electronic circuit. In this embodiment, the information stored in the memory of the electronic circuit is a contributing factor in causing the imaging machine to reject the electronic circuit. Therefore, the electronic circuit alters the information stored in its memory so that the imaging machine will accept the electronic circuit.

In an additional sub-embodiment, the step of altering the information in the electronic circuit comprises altering the data in the electronic circuit. In this embodiment, the data stored in the memory of the electronic circuit is a contributing factor in causing the imaging machine to reject the electronic circuit. Therefore, the electronic circuit alters the data stored in its memory so that the imaging machine will accept the electronic circuit.

In an additional sub-embodiment, the step of altering the data comprises changing the value of a bit of the data. In this embodiment, the value of a bit of the data stored in the memory of the electronic circuit is a contributing factor in causing the imaging machine to reject the electronic circuit. Therefore, the electronic circuit alters the value of the bit of the data stored in its memory so that the imaging machine will accept the electronic circuit.

In an additional sub-embodiment, the step of altering the information in the electronic circuit comprises altering the page count of the electronic circuit. In this embodiment, the page count stored in the memory of the electronic circuit is a contributing factor in causing the imaging machine to reject the electronic circuit. Therefore, the electronic circuit alters the page count stored in its memory so that the imaging machine will accept the electronic circuit.

In an additional sub-embodiment, the step of altering the information in the electronic circuit comprises altering the printable material indicator of the electronic circuit. In this embodiment, the printable material indicator stored in the memory of the electronic circuit is a contributing factor in causing the imaging machine to reject the electronic circuit. Therefore, the electronic circuit alters the printable material indicator stored in its memory so that the imaging machine will accept the electronic circuit.

In an additional sub-embodiment, the printable material indicator indicates a measured printable material amount or a calculated printable material amount determined using a printed pixel count. In this embodiment, the printable material indicator shows a printable material amount that is determined by either measuring the amount of printable material in the imaging cartridge or by determining the number of pixels the imaging cartridge has printed and calculating the remaining printable material amount based on the initial amount of printable material in the cartridge minus the amount of printed pixels.

In an additional sub-embodiment, the step of altering the information in the electronic circuit comprises altering the drum rotation count of the electronic circuit. In this embodiment, the drum rotation count stored in the memory of the electronic circuit is a contributing factor in causing the imaging machine to reject the electronic circuit. Therefore, the electronic circuit alters the drum rotation count stored in its memory so that the imaging machine will accept the electronic circuit.

In an additional sub-embodiment, the step of altering the information in the electronic circuit comprises altering the elapsed time value of the electronic circuit. In this embodiment, the elapsed time value stored in the memory of the electronic circuit is a contributing factor in causing the imaging machine to reject the electronic circuit. Therefore, the electronic circuit alters the elapsed time value stored in its memory so that the imaging machine will accept the electronic circuit.

In an additional sub-embodiment, the step of the electronic circuit transforming itself to a state that the electronic circuit is again accepted by the imaging machine comprises altering the identifier of the electronic circuit. In this embodiment, the identifier of the electronic circuit has been stored in the memory of the imaging machine along with information causing the electronic circuit to reject the circuit. As a result, the imaging machine is able to recognize the electronic circuit as being a circuit that the imaging machine should reject. Therefore, if information on the electronic circuit is altered, but the circuit's identifier stays the same, the imaging machine will think that the electronic circuit is a clone of itself and will reject the electronic circuit. Therefore, in order to transform the electronic circuit to a state where the imaging machine will accept the circuit again, the electronic circuit must change its identifier so that the imaging machine will think that the electronic circuit is a completely different circuit.

In an additional sub-embodiment, the electronic circuit transforms itself to a state that the electronic circuit is again accepted by the imaging machine after a pre-determined event has occurred. In this embodiment, the electronic circuit stays in a state where it will be rejected by the imaging machine until a pre-determined event occurs. Once the pre-determined event occurs, the electronic circuit is triggered to transform itself to a state where the electronic circuit is again accepted by the imaging machine. This allows the electronic circuit to stay in a state where it will be rejected by the imaging machine until it is desired that the electronic circuit transform itself.

In an additional sub-embodiment, the pre-determined event is the electronic circuit powering down, the electronic circuit powering up, the electronic circuit entering sleep mode, the electronic circuit waking from sleep mode, the electronic circuit reaching a pre-determined temperature, the electronic circuit communicating with a pre-determined number of imaging machines, the imaging cartridge having printed a pre-determined number of pages, a pre-determined amount of printable material being used, a pre-determined amount of time having elapsed, a pre-determined number of drum rotations, or the imaging machine having performed a pre-determined number of cycles with the electronic circuit. When any one of these predetermined events occurs, the electronic circuit is triggered to transform itself.

In an additional sub-embodiment, the electronic circuit ceases to transform itself to a state that the electronic circuit is again accepted by the imaging machine after a pre-determined event has occurred. In this embodiment, once the pre-determined event occurs, the electronic circuit is triggered to not transform itself to a state where the imaging machine accepts the electronic circuit. This allows the electronic circuit to transform itself to be accepted by the imaging machine up until the pre-determined event occurs, but once the pre-determined event occurs, the electronic circuit ceases to transform itself anymore.

In an additional sub-embodiment, the imaging machine is a first imaging machine, and the step of altering said electronic circuit such that said electronic circuit is no longer accepted by the first imaging machine comprises marrying the electronic circuit to a second imaging machine. In this embodiment, the electronic circuit is married to a second imaging machine, and therefore the first imaging machine will no longer accept the electronic circuit.

In an additional sub-embodiment, the step of the electronic circuit transforming itself to a state that the electronic circuit is again accepted by the imaging machine comprises the electronic circuit transforming itself to no longer be married to the second imaging machine. In this embodiment, the electronic circuit is married to a second imaging machine, and therefore the first imaging machine will no longer accept the electronic circuit. The electronic circuit then alters itself to no longer be married to the second imaging machine, so that the first imaging machine recognizes the electronic circuit as not being married to the second imaging machine. As a result, the first imaging machine will accept the electronic circuit, and will not reject the electronic circuit as being married to another imaging machine.

In a fourth embodiment, a method of operating an electronic circuit for use with a consumable imaging unit, comprises the steps of: providing the electronic circuit adapted to communicate with an imaging machine; the electronic circuit comprising a first element and a second element; the first and second elements being associated with a characteristic of the consumable imaging unit; the first element being in a non-communicated state; pointing the imaging machine to communicate with the first element; altering the first element to put the first element in a communicated state; and then pointing the imaging machine to communicate with the second element. In this embodiment, the electronic circuit has two different elements that are both associated with the same characteristic of the consumable imaging unit. The first and second elements are both in their original state, which is the state they are in after the electronic circuit has been programmed with information, but has never communicated with any imaging machine. When the electronic circuit enters into communication with the imaging machine, the circuit points the imaging machine to communicate with the first element in order for the imaging machine to receive information regarding the characteristic. Next, the first element is altered from its original state. Once the first element has been altered from its original state, the electronic circuit then points the imaging machine to communicate with the second element in order for the imaging machine to receive information regarding the characteristic. In one example, the electronic circuit comprises a memory unit comprising information configured to point said imaging machine to communicate with said second element after said information determines that said first element has been altered from its original state.

In a sub-embodiment, the step of altering the first element from the first element's original state comprises altering the first element to indicate that the electronic circuit is in a communicated state; and the second element indicating that the electronic circuit is in a non-communicated state. In this embodiment, when the first element is altered from its original state, the imaging machine is able to recognize the electronic circuit as being in a communicated state. Therefore, the electronic circuit then points the imaging machine to communicate with the second element, which is in a non-communicated state, so the imaging machine recognizes the electronic circuit as being in a non-communicated state.

In an additional sub-embodiment, the electronic circuit points the imaging machine to communicate with the second element after a pre-determined event has occurred. In this embodiment, the electronic circuit continues to point the imaging machine to communicate with the first element until a pre-determined event occurs. Once the pre-determined event occurs, the electronic circuit is triggered to point the imaging machine to communicate with the second element. This allows the electronic circuit to keep pointing the imaging machine to communicate with the first element until it is desired that the imaging machine be pointed to communicate with the second element.

In an additional sub-embodiment, the pre-determined event is the electronic circuit powering down, the electronic circuit powering up, the electronic circuit entering sleep mode, the electronic circuit waking from sleep mode, the electronic circuit reaching a pre-determined temperature, the electronic circuit communicating with a pre-determined number of imaging machines, the imaging cartridge having printed a pre-determined number of pages, a pre-determined amount of printable material being used, a pre-determined amount of time having elapsed, a pre-determined number of drum rotations, or the imaging machine having performed a pre-determined number of cycles with the electronic circuit. When any one of these predetermined events occurs, the electronic circuit is triggered to point the imaging machine to communicate with the second element.

In an additional sub-embodiment, the electronic circuit ceases to point the imaging machine to communicate with the second element after a pre-determined event has occurred. In this embodiment, once a pre-determined event occurs, the electronic circuit is triggered to not transform itself to a state where the imaging machine accepts the electronic circuit. This allows the electronic circuit to point the imaging machine to communicate with the second element up until the pre-determined event occurs, but once the pre-determined event occurs, the electronic circuit ceases to point the imaging machine to communicate with the second element.

In a fifth embodiment, a method of operating an electronic circuit for use with a consumable imaging unit comprises the steps of providing the electronic circuit adapted to communicate with an imaging machine; the electronic circuit comprising a first element and a second element; the electronic circuit comprising a pre-determined usable life and an actual life; the first element limiting the pre-determined usable life to an initial extent; pointing the imaging machine to communicate with the first element; altering the first element to deplete a portion of the pre-determined usable life; and then pointing the imaging machine to communicate with the second element to extend the actual life to exceed the initial extent of the pre-determined useable life. In this embodiment, the electronic circuit has two different elements. Additionally, the electronic circuit has a pre-determined usable life comprising an initial extent and an actual life. The actual life is the actual life that the electronic circuit achieves and the pre-determined usable life is a pre-set life in the electronic circuit that limits the actual life that the electronic circuit achieves. When the electronic circuit reaches its pre-determined usable life, the imaging machine recognizes this and rejects the electronic circuit, thus ending the electronic circuit's actual life. When the electronic circuit enters into communication with the imaging machine, the electronic circuit points the imaging machine to communicate with the first element. Next, the first element is altered to deplete a portion of the pre-determined usable life. Once the first element has been altered, the electronic circuit extends its actual life beyond the initial extent of the pre-determined usable life by pointing the imaging machine to communicate with the second element.

In a sub-embodiment, the electronic circuit points the imaging machine to communicate with the second element after a pre-determined event has occurred. In this embodiment, the electronic circuit continues to point the imaging machine to communicate with the first element until a pre-determined event occurs. Once the pre-determined event occurs, the electronic circuit is triggered to point the imaging machine to communicate with the second element. This allows the electronic circuit to keep pointing the imaging machine to communicate with the first element until it is desired that the imaging machine be pointed to communicate with the second element.

In an additional sub-embodiment, the pre-determined event is the electronic circuit powering down, the electronic circuit powering up, the electronic circuit entering sleep mode, the electronic circuit waking from sleep mode, the electronic circuit reaching a pre-determined temperature, the electronic circuit communicating with a pre-determined number of imaging machines, the imaging cartridge having printed a pre-determined number of pages, a pre-determined amount of printable material being used, a pre-determined amount of time having elapsed, a pre-determined number of drum rotations, or the imaging machine having performed a pre-determined number of cycles with the electronic circuit. When any one of these predetermined events occurs, the electronic circuit is triggered to point the imaging machine to communicate with the second element.

In an additional sub-embodiment, the electronic circuit ceases to point the imaging machine to communicate with the second element after a pre-determined event has occurred. In this embodiment, once the pre-determined event occurs, the electronic circuit is triggered to not transform itself to a state where the imaging machine accepts the electronic circuit. This allows the electronic circuit to point the imaging machine to communicate with the second element until the pre-determined event occurs, but once the pre-determined event occurs, the electronic circuit ceases to point the imaging machine to communicate with the second element.

In a sixth embodiment, a method of operating an electronic circuit for use with a consumable imaging unit comprises: providing the electronic circuit adapted to be accepted by an imaging machine; the electronic circuit comprising a first element and a second element; pointing said imaging machine to communicate with said first element; altering the first element such that the electronic circuit is no longer adapted to be accepted by the imaging machine; and then pointing the imaging machine to communicate with the second element such that the electronic circuit is again adapted to be accepted by the imaging machine.

In this embodiment, the electronic circuit has two different elements. When the electronic circuit enters into communication with the imaging machine, the circuit points the imaging machine to communicate with the first element. Next, the first element is altered so that the imaging machine no longer accepts the electronic circuit. Once the first element has been altered, the electronic circuit then points the imaging machine to communicate with the second element in order for the electronic circuit to be accepted by the imaging machine again.

When the electronic circuit reaches its pre-determined usable life, the imaging machine recognizes this and rejects the electronic circuit, thus ending the electronic circuit's actual life. When the electronic circuit enters into communication with the imaging machine, the electronic circuit points the imaging machine to communicate with the first element. Next, the first element is altered to deplete a portion of the pre-determined usable life. Once the first element has been altered, the electronic circuit extends its actual life beyond the initial extent of the pre-determined usable life by pointing the imaging machine to communicate with the second element.

In a sub-embodiment, the electronic circuit points the imaging machine to communicate with the second element after a pre-determined event has occurred. In this embodiment, the electronic circuit continues to point the imaging machine to communicate with the first element until a pre-determined event occurs. Once the pre-determined event occurs, the electronic circuit is triggered to point the imaging machine to communicate with the second element. This allows the electronic circuit to keep pointing the imaging machine to communicate with the first element until it is desired that the imaging machine be pointed to communicate with the second element.

In an additional sub-embodiment, the pre-determined event is the electronic circuit powering down, the electronic circuit powering up, the electronic circuit entering sleep mode, the electronic circuit waking from sleep mode, the electronic circuit reaching a pre-determined temperature, the electronic circuit communicating with a pre-determined number of imaging machines, the imaging cartridge having printed a pre-determined number of pages, a pre-determined amount of printable material being used, a pre-determined amount of time having elapsed, a pre-determined number of drum rotations, or the imaging machine having performed a pre-determined number of cycles with the electronic circuit. When any one of these predetermined events occurs, the electronic circuit is triggered to point the imaging machine to communicate with the second element.

In an additional sub-embodiment, the electronic circuit ceases to point the imaging machine to communicate with the second element after a pre-determined event has occurred. In this embodiment, once the pre-determined event occurs, the electronic circuit is triggered to not transform itself to a state where the imaging machine accepts the electronic circuit. This allows the electronic circuit to point the imaging machine to communicate with the second element up until the pre-determined event occurs, but once the pre-determined event occurs, the electronic circuit ceases to point the imaging machine to communicate with the second element.

In an additional sub-embodiment, the imaging machine is a first imaging machine; and the step of altering the first element such that the electronic circuit is no longer accepted by the first imaging machine comprises marrying the electronic circuit to a second imaging machine. In this embodiment, the first element is altered so that the electronic circuit is married to a second imaging machine and therefore the electronic circuit will no longer be accepted by the first imaging machine.

In an additional sub-embodiment, the second element does not indicate that the electronic circuit is married to the second imaging machine. Therefore, when the electronic circuit points the first imaging machine to communicate with the second element, the first imaging machine will not recognize the electronic circuit as being married to the second imaging machine and the first imaging machine will again accept the electronic circuit.

In an additional sub-embodiment, the consumable imaging unit comprises a characteristic; and the first and second elements are associated with the characteristic. In this embodiment, the first and second elements are both associated with the same characteristic of the imaging unit.

In an additional embodiment, the electronic circuit comprises an identifier comprising a value; and the step of pointing the imaging machine to communicate with the second element such that the electronic circuit is again adapted to be accepted by the imaging machine comprises changing the value of the identifier. In this embodiment, when the electronic circuit points the imaging machine to communicate with the second element, the electronic circuit also changes the value of its identifier so the imaging machine recognizes the electronic circuit as a different circuit.

In a seventh embodiment, a method of operating an electronic circuit for use with a consumable imaging unit comprises the steps of: providing the electronic circuit adapted communicate with an imaging machine; the electronic circuit comprising an identifier comprising a value; and the electronic circuit changing the value of the identifier. In this embodiment, the electronic circuit comprises an identifier having a first value. When the electronic circuit enters into communication with the imaging machine, the electronic circuit communicates the circuit's identifier to the imaging machine. The imaging machine then stores the value of the identifier in the imaging machine's memory as being the identifier of the electronic circuit, and now the imaging machine recognizes that it has communicated with the electronic circuit. Then, the electronic circuit changes the value of its identifier, so that when the imaging machine requests to check the identifier of the electronic circuit at a later time, the electronic circuit communicates the identifier having a different value to the imaging machine. Since the electronic circuit's identifier has been changed, the imaging machine recognizes the electronic circuit as being a different electronic circuit.

In a sub-embodiment, the identifier is generated based on information in the electronic circuit; the information comprising a value; and the step of changing the value of the identifier comprising changing the value of the information. In this embodiment, the identifier is generated based on information stored in the electronic circuit. Therefore, in order to change the value of the identifier the value of the information used to generate the identifier is changed.

In an eighth embodiment, a method of operating an electronic circuit for use with a consumable imaging unit comprises the steps of: providing the electronic circuit adapted to communicate with an imaging machine; the electronic circuit comprising a first element and a second element; the first element comprising a first identifier comprising a first value; the second element comprising a second identifier comprising a second value; the first and second identifiers being of the same type; pointing the imaging machine to communicate with the first element; and then pointing the imaging machine to communicate with the second element. In this embodiment, the electronic circuit comprises two elements, the elements each having an identifier of the same type. The identifier of the first element comprises a different value from the identifier of the second element. When the electronic circuit enters into communication with the imaging machine, the electronic circuit points the imaging machine to communicate with the first element in order to communicate the circuit's identifier to the imaging machine as being the first element's identifier. The imaging machine then stores the value of the first element's identifier in the imaging machine's memory as being the identifier of the electronic circuit, and now the imaging machine recognizes that it has communicated with the electronic circuit. Then, when the imaging machine requests to check the identifier of the electronic circuit at a later time, the electronic circuit points the imaging machine to communicate with the second element in order to communicate the second element's identifier to the imaging machine. Since the second element's identifier is different from the first element's identifier, the imaging machine recognizes the electronic circuit as being a different electronic circuit.

DETAILED DESCRIPTION OF THE PREFERRED EMBODIMENT

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

Figure 1:
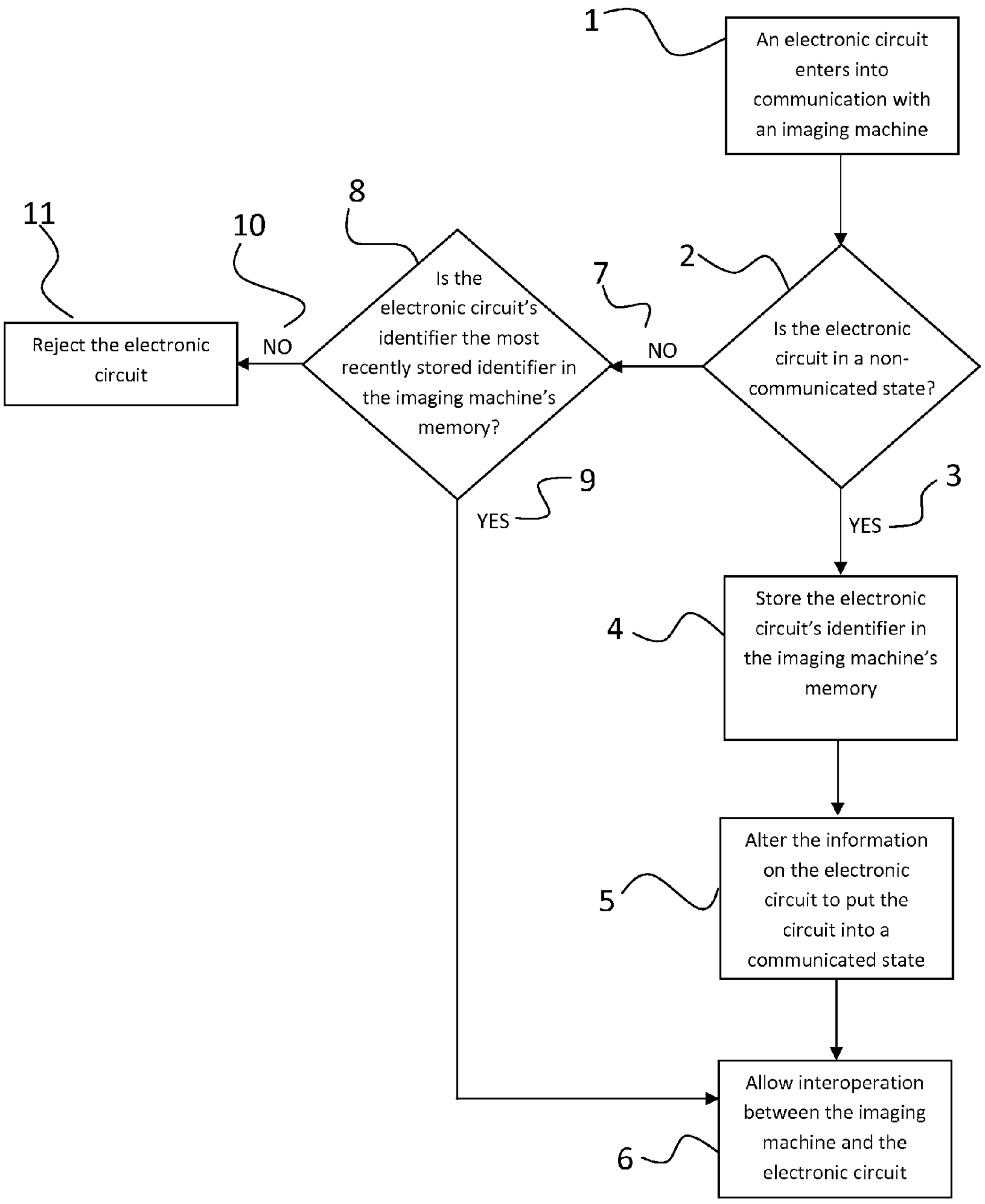
FIG. 1 PRIOR ART
FIG. 1 is a flow chart describing a procedure used by prior art imaging machines.

During operation, imaging machines perform several procedures to determine if the imaging machine is going to accept or reject the electronic circuit of an imaging cartridge. FIG. 1 shows a flow chart that illustrates one of these procedures, wherein once an electronic circuit is entered into communication with the imaging machine 1, the imaging machine first determines if the electronic circuit is in a non-communicated state 2.

If the electronic circuit is in a non-communicated state 3, the imaging machine marries the electronic circuit to the imaging machine by storing the electronic circuit's identifier in the imaging machine's memory 4, and also altering the information on the electronic circuit to put the electronic circuit into a communicated state 5. The imaging machine then accepts the electronic circuit and allows interoperation between the electronic circuit and the imaging machine 6.

If the electronic circuit is not in a non-communicated state 7, the imaging machine determines if the electronic circuit's identifier is the most recently stored identifier in the imaging machine's memory 8. If the electronic circuit's identifier is the most recently stored identifier in the imaging machine's memory 9, the imaging machine accepts the electronic circuit and allows interoperation between the electronic circuit and the imaging machine 6. If the electronic circuit's identifier is not the most recently stored identifier in the imaging machine's memory 10, the imaging machine rejects the electronic circuit and does not allow interoperation between the electronic circuit and the imaging machine 11.

Figure 2:
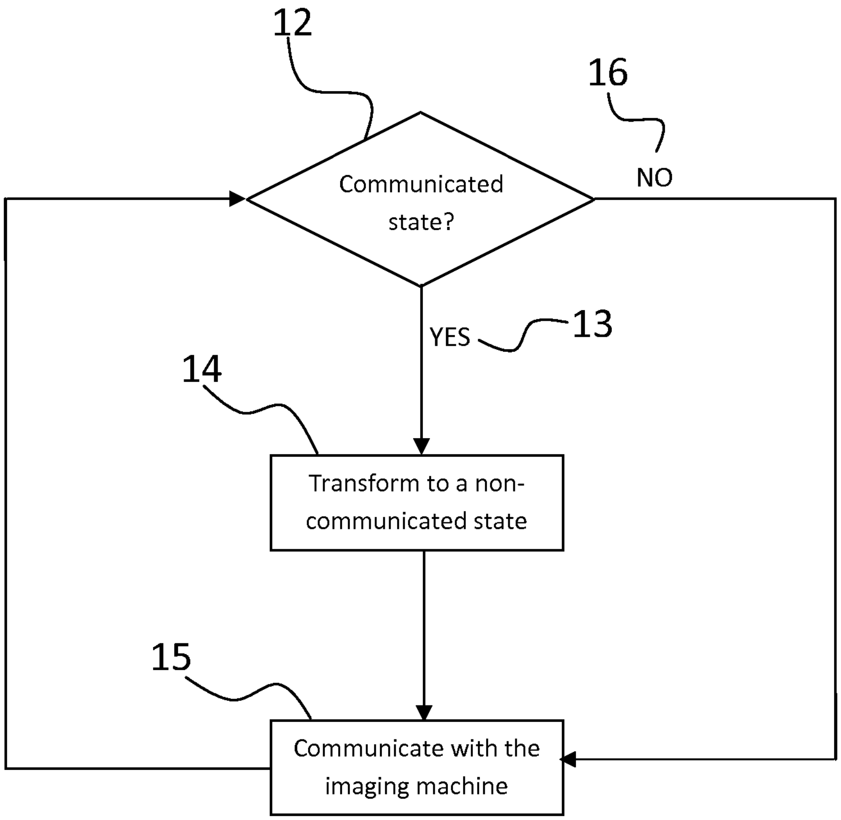
FIG. 2 is a flow chart describing a procedure in which the electronic circuit transforms itself to a non-communicated state.

FIG. 2 shows a method of the preferred embodiment in which the electronic circuit transforms itself to a non-communicated state. First, the electronic circuit determines if it is in a communicated state 12. If the electronic circuit is in a communicated state 13, the electronic circuit transforms itself to a non-communicated state 14, so that the imaging machine will recognize the electronic circuit as being in a non-communicated state. The electronic circuit then undergoes standard communications with the imaging machine 15. If the electronic circuit is in a non-communicated state 16, the electronic circuit simply undergoes standard communications with the imaging machine 15.

In order for the imaging machine to recognize that the electronic circuit is in a communicated state, an element of the electronic circuit must indicate that the electronic circuit is in a communicated state. Therefore, in order for the electronic circuit to transform itself to a non-communicated state 14, it must alter the element that is indicating that it is in a communicated state to a state that the imaging machine no longer recognizes as being a communicated state.

Most commonly the electronic circuit is put into a communicated state 5 by having the information stored in its memory altered to a value that indicates that the electronic circuit is in a communicated state. In this case, the electronic circuit transforms itself to a non-communicated state 14 by altering the information stored in its memory to a value that the imaging machine recognizes as being in a non-communicated state. There are many methods of altering the electronic circuit's information to put the electronic circuit into a communicated. The follow are some examples, but methods of altering the circuit's information are not limited to the following examples.

One method of altering the electronic circuit's information to put the electronic circuit into a communicated state 5 is to alter the data in the memory of the electronic circuit by changing a value of at least one bit of the data. Once the value of at least one bit is altered to indicate that the electronic circuit is in a communicated state, the imaging machine is able to read the altered data and recognize that the electronic circuit is in a communicated state. Therefore, in order for the electronic circuit to transform itself to a non-communicated state 14, it must alter its data to a value that the imaging machine recognizes as being a non-communicated state. This may comprise changing the electronic circuit's data back to its original value, or to any other value that the imaging machine recognizes as being a non-communicated state.

Another method of altering the electronic circuit's information to transform the electronic circuit into a communicated state 5 is to alter the value of the page count stored in the memory of the electronic circuit. Under normal operation, the electronic circuit keeps track of the number of pages the imaging cartridge has printed and stores this information in its memory as a page count. Once the page count in the electronic circuit's memory increases, the imaging machine is able to detect the increase and use the increased page count to indicate the electronic circuit is in a communicated state. Therefore, in order for the electronic circuit to transform itself to a non-communicated state 14, it must alter its page count to a value that the imaging machine recognizes as being a non-communicated state. This may comprise changing the electronic circuit's page count back to its original value, or to any other value that the imaging machine recognizes as being a non-communicated state.

Another method of altering the electronic circuit's information to transform the electronic circuit into a communicated state 5 is to alter the value of the printable material indicator stored in the memory of the electronic circuit. Under normal operation, the electronic circuit keeps track of the amount of printable material remaining in the imaging cartridge and stores this information in its memory as a printable material indicator. When the imaging cartridge prints, the printable material in the cartridge decreases and the decreased printable material level in the cartridge is stored in the printable material indicator of the electronic circuit. Once the printable material indicator in the electronic circuit's memory decreases, the imaging machine is able to detect the decrease and use the decreased printable material indicator to indicate the electronic circuit is in a communicated state. Therefore, in order for the electronic circuit to transform itself to a non-communicated state 14, it must alter its printable material indicator to a value that the imaging machine recognizes as being a non-communicated state. This may comprise changing the electronic circuit's printable material indicator back to its original value, or to any other value that the imaging machine recognizes as being a non-communicated state. The most common methods that the electronic circuit uses to detect the amount of printable material remaining in the cartridge is to either receive a printable material level that is measured by the imaging cartridge and relayed to the electronic circuit, or to calculate the printable material level based on the number of pixels the imaging cartridge has printed, but any method that indicates the amount of printable material remaining in the imaging cartridge falls within the scope of the invention.

Another method of altering the electronic circuit's information to transform the electronic circuit into a communicated state 5 is to alter the value of the drum rotation count stored in the memory of the electronic circuit. Under normal operation, the electronic circuit keeps track of the number of rotations the imaging cartridge's photoconductive drum has completed and stores this information in its memory as a drum rotation count. Once the drum rotation count in the electronic circuit's memory increases, the imaging machine is able to detect the increase and use the increased drum rotation count to indicate the electronic circuit is in a communicated state. Therefore, in order for the electronic circuit to transform itself to a non-communicated state 14, it must alter its drum rotation count to a value that the imaging machine recognizes as being a non-communicated state. This may comprise changing the electronic circuit's drum rotation count back to its original value, or to any other value that the imaging machine recognizes as being a non-communicated state.

Yet another method of altering the electronic circuit's information to transform the electronic circuit into a communicated state 5 is to alter the value of the timer in the memory of the electronic circuit. Under normal operation, the electronic circuit comprises a timer and keeps track of elapsed time and stores this information in the circuit's memory. Once time has elapsed on the timer, the imaging machine is able to detect the elapsed time and use the elapsed time to indicate the electronic circuit is in a communicated state. Therefore, in order for the electronic circuit to transform itself to a non-communicated state 14, it must alter its timer to a value that the imaging machine recognizes as being a non-communicated state. This may comprise changing the electronic circuit's elapsed time back to its original value, or to any other value that the imaging machine recognizes as being a non-communicated state.

In an example, the timer reads 0 seconds when the electronic circuit first enters into communication with the imaging machine, but after operation now reads 250 seconds. Thus the electronic circuit alters the value of the timer to no longer read 250 seconds, but rather 0 seconds, so the imaging machine does not recognize that time has elapsed.

In this example, the timer doesn't have to be altered to read 0 seconds. Any value in which the imaging machine will recognize the circuit as being in a non-communicated state is envisioned.

In another example, instead of altering the value of the timer, the electronic circuit communicates a value to the imaging machine that is different from the actual value of the timer. In this example, instead of altering the value of the timer back to 0 seconds, as in the example directly above, the electronic circuit doesn't alter the value of the timer, but rather communicates to the imaging machine that the value of the timer is 0 seconds.

In another example, instead of altering the value of the timer, the electronic circuit transforms itself to a non-communicated state by altering the value of the elapsed time that is communicated to the imaging machine. When the circuit first enters into operation with the imaging machine, the circuit communicates to the imaging machine that 0 seconds have elapsed. However, after the circuit operates with the imaging machine for 250 seconds, instead of communicating an elapsed time of 250 seconds to the imaging machine, the electronic circuit communicates an elapsed time of 0 seconds. Thus the imaging machine recognizes that no time has elapsed and recognizes the circuit as being in a non-communicated state. In this example, an elapsed time value of 0 seconds doesn't have to be communicated to the imaging machine. Any value in which the imaging machine will recognize the circuit as not being in a non-communicated state is envisioned.

The above methods that the electronic circuit uses to transform itself to a non-communicated state 14 describe the preferred embodiment, but the invention is not limited to these methods. Any method that an electronic circuit uses to transform itself from a communicated state to a non-communicated state falls within the scope of the invention.

By changing itself to a non-communicated state, the electronic circuit is able to un-marry an imaging machine. In an example, an electronic circuit contains information that allows it to initially be accepted by a first and a second imaging machine. When the electronic circuit is entered into communication with the first imaging machine, the first imaging machine stores an identifier of the electronic circuit in the memory of the first imaging machine. Then, once the imaging cartridge prints, the information in the electronic circuit is altered to indicate the updated status of the characteristics of the cartridge, such as the page count and printable material indicator, placing the electronic circuit in a communicated state. Once an identifier of the electronic circuit is stored in the first imaging machine and the electronic circuit has been altered to indicate that the electronic circuit is in a communicated state, the electronic circuit is married to the first imaging machine, and therefore will not be accepted by the second imaging machine.

In order to un-marry the first imaging machine, and allow the electronic circuit to be accepted by the second imaging machine, the electronic circuit transforms itself into a non-communicated state by altering the information in the electronic circuit to a state where the second imaging machine recognizes the electronic circuit as being in a non-communicated state. This can be altering the information back to its original state, or to any other state where the second imaging machine will recognize the electronic circuit as being in a non-communicated state. Therefore, when the electronic circuit is entered into communication with the second imaging machine, the second imaging machine recognizes the circuit as being in a non-communicated state and accepts the electronic circuit. Once the imaging cartridge prints in the second imaging machine, the electronic circuit is married to the second imaging machine in the same manner that it was married to the first imaging machine.

Figure 3:
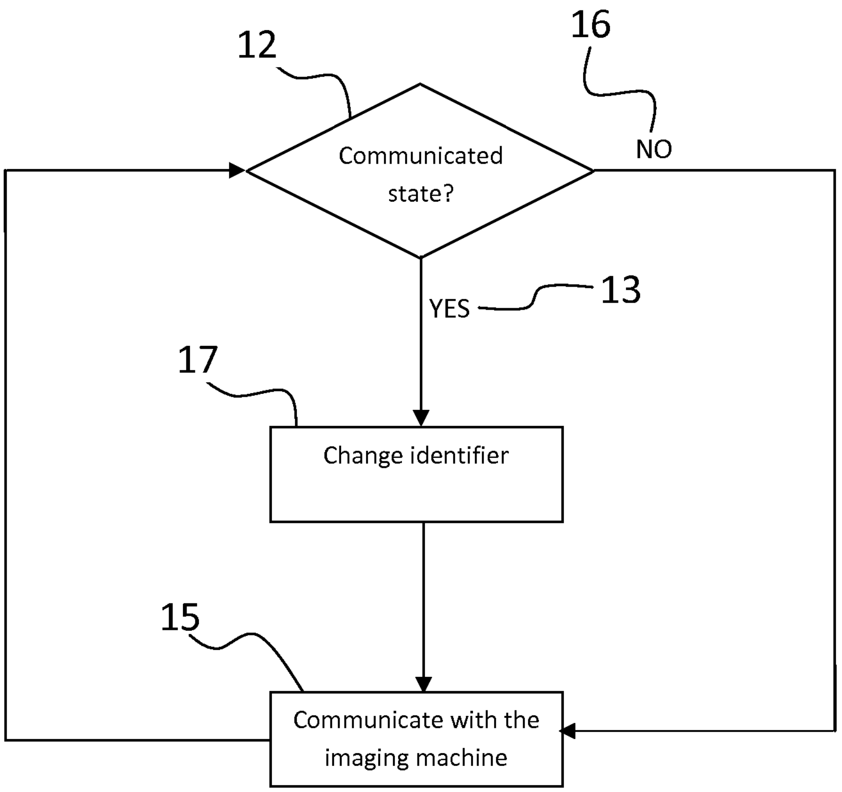
FIG. 3 is a flow chart describing a procedure in which the electronic circuit transforms itself by changing its identifier.

FIG. 3 shows another method of the preferred embodiment in which the electronic circuit transforms itself by changing an identifier of the circuit to prevent an imaging machine from rejecting the circuit. In this embodiment, the electronic circuit first determines if it is in a communicated state 12. If the electronic circuit is in a communicated state 13, the electronic circuit changes one or more of its identifiers 17, so that the imaging machine will not recognize the electronic circuit as being a circuit with which the imaging machine has previously communicated, and therefore will not reject the circuit. The electronic circuit then undergoes standard communications with the imaging machine 15. If the electronic circuit is in a non-communicated state 16, the electronic circuit simply undergoes standard communications with the imaging machine 15.

In an example of the above embodiment, an imaging machine keeps a chronological list of the identifiers of the imaging cartridges the imaging machine has communicated with. When a first electronic circuit enters into communication with the imaging machine, the imaging machine stores an identifier of the electronic circuit in the most recent position on the list. When a second electronic circuit enters into communication with the imaging machine, the imaging machine stores an identifier of the second electronic circuit in the most recent position on the list and the first circuit's identifier is moved to the second most recent position on the list. The imaging machine will only accept an electronic circuit if its identifier is stored in the most recent position on the list, or if the circuit's identifier is not stored in the list. As a result, if a bank prints in the imaging machine with a first cartridge for standard printing, and then prints in the imaging with a second cartridge for printing checks, if the first cartridge is entered into communication with the imaging machine again, the imaging machine will recognize that an identifier of the first imaging cartridge is stored in the list, but it is not in the most recent position in the list, and therefore the imaging machine will reject the first electronic circuit. In order for the first electronic circuit to be accepted by the imaging machine again, the first electronic circuit changes its identifier so that the imaging machine recognizes the first circuit as being a different circuit with which the imaging machine has never communicated. This allows the bank to use one imaging cartridge in an imaging machine for printing checks and another cartridge in the same imaging machine for all other printing.

In some cases, the identifier of the electronic circuit can simply be changed from one value to another value. In a different example, the identifier of the electronic circuit is generated based on information stored in the circuit, so in order for a different identifier to be generated the information in the circuit is altered. In a third example, the circuit comprises two different pre-generated identifiers of the same type. Therefore, instead of altering the circuit's identifier, once the imaging machine has stored the first identifier in its memory, the circuit simply communicates the second identifier to the imaging machine.

Figure 4:
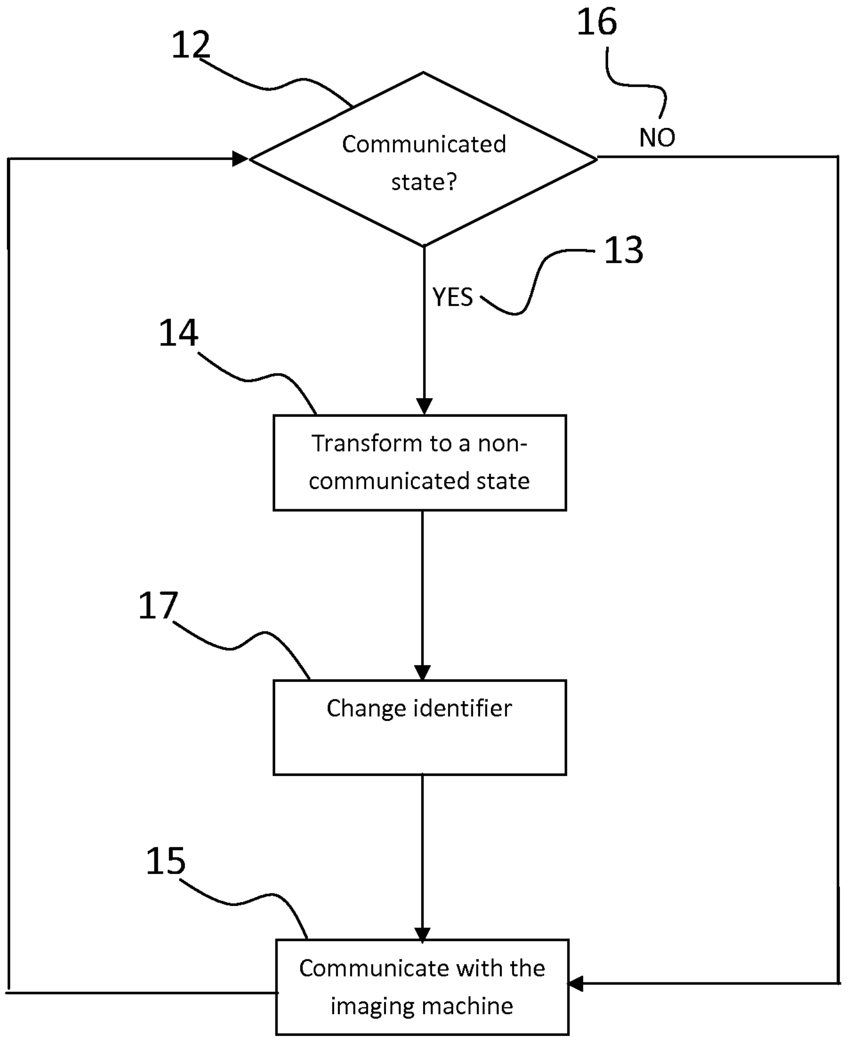
FIG. 4 is a flow chart describing a procedure in which the electronic circuit both transforms itself to a non-communicated state and changes its identifier.

FIG. 4 shows another method of the preferred embodiment, in which the electronic circuit transforms itself to a non-communicated state, and also changes an identifier of the circuit. After the electronic circuit determines that it is in a communicated state 13, the electronic circuit transforms itself to a non-communicated state 14 and also changes an identifier of the circuit 17. Once the electronic circuit has transformed itself to a non-communicated state and has also changed its identifier, the imaging machine will recognize the electronic circuit as a different, non-communicated, circuit and will begin operating with the circuit as such. As a result, if any of the elements of the electronic circuit have had a portion of their pre-determined life consumed, then the electronic circuit can alter the element to a previous state in order regain a portion (or all) of the element's life in order to achieve an actual life having a greater than extent than the initial pre-determined usable life.

This embodiment allows the follow scenario:

1) a first electronic circuit is used with a MICR imaging cartridge to communicate with a first imaging machine to print checks in the first imaging machine;
2) the first electronic circuit is married to the first imaging machine by being altered into a communicated state and having an identifier of the circuit stored in the most recent position in the identifier list in the first imaging machine's memory;
3) a second electronic circuit is then used with a standard imaging cartridge to communicate with the first imaging machine to print standard documents in the first imaging machine;
4) an identifier of the second circuit is stored in the most recent position in the identifier list in the first imaging machine's memory, and the first circuit's identifier is moved to the second most recent position on the identifier list in the first imaging machine's memory;
5) the first electronic circuit un-marries the first imaging machine by transforming itself to be in a non-communicated state so that the first circuit can be used to print checks in a second imaging machine;
6) the first electronic circuit is married to the second imaging machine by being altered into a communicated state and having an identifier of the circuit stored in the second imaging machine's memory;
7) The first electronic circuit un-marries the second imaging machine by transforming itself into a non-communicated state; and
8) the first electronic circuit transforms itself to again be accepted by the first imaging machine by changing its identifier so that the first imaging machine recognizes the first electronic circuit as being a different circuit with which the first imaging machine has never communicated.

Figure 5:
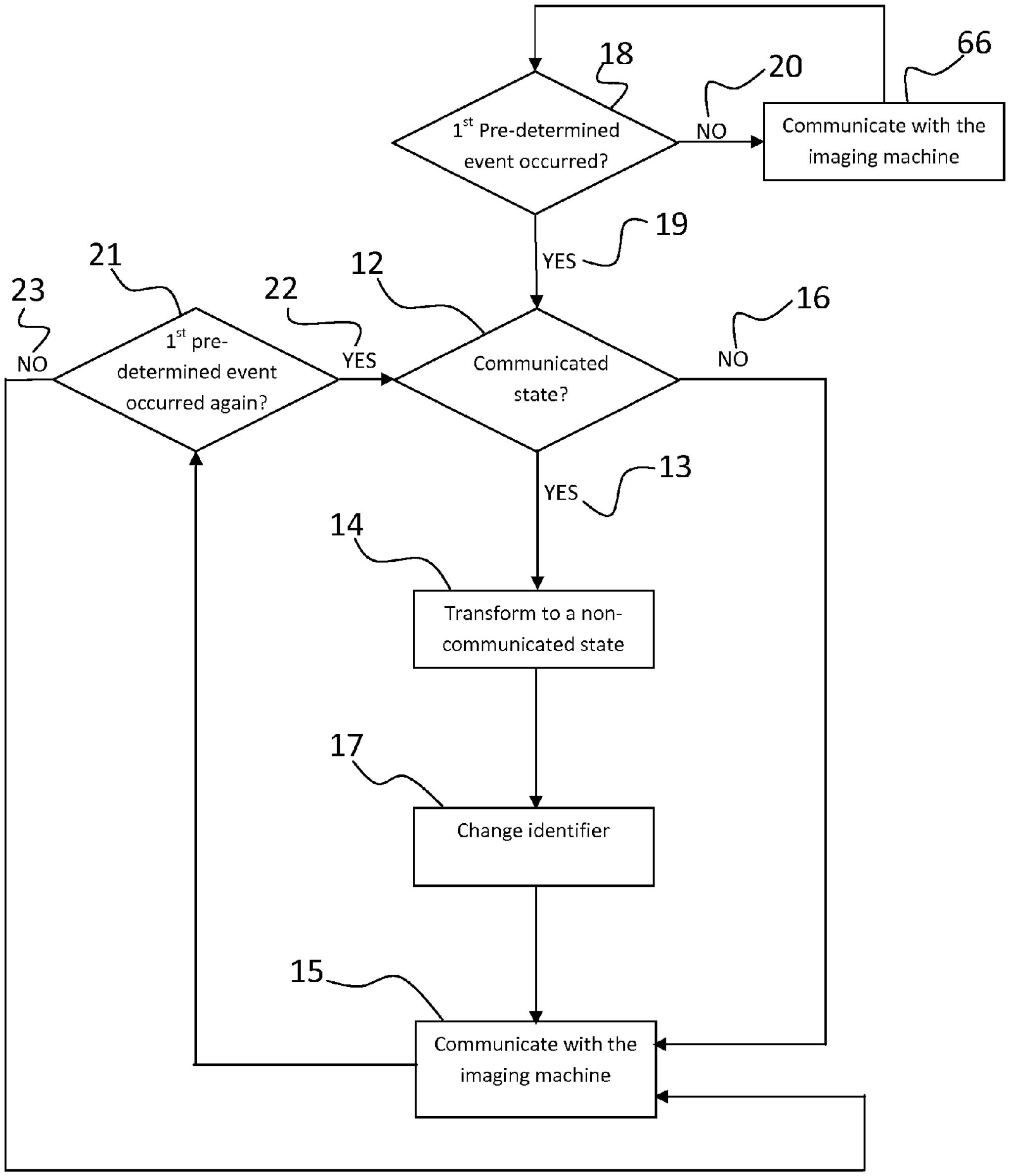
FIG. 5 is a flow chart describing a procedure in which the electronic circuit both transforms itself to a non-communicated state and changes its identifier after a pre-determined event occurs.

FIG. 5 shows another method of the preferred embodiment where the electronic circuit is triggered to un-marry an imaging machine after a pre-determined event occurs. First, the electronic circuit determines if a pre-determined event has occurred 18. If a pre-determined event has occurred 19, then the electronic circuit performs the method in FIG. 4 to un-marry the imaging machine before undergoing standard communications with the imaging machine 15. If a pre-determined event has not occurred 20, then the electronic circuit simply undergoes standard communications with the imaging machine 66.

The electronic circuit keeps checking to see if the pre-determined event occurs again 21. If the predetermined event occurs again 22, then the electronic circuit performs the method in FIG. 4 to transform itself to un-marry the imaging machine before undergoing standard communications with the imaging machine 15. If the pre-determined event has not occurred again 23, then the electronic circuit simply undergoes standard communications with the imaging machine 15.

Examples of pre-determined events that trigger the circuit to transform itself include, but are not limited to the electronic circuit powering down, the electronic circuit powering up, the electronic circuit entering sleep mode, the electronic circuit waking from sleep mode, the electronic circuit reaching a pre-determined temperature, the electronic circuit communicating with a pre-determined number of imaging machines, the imaging cartridge having printed a pre-determined number of pages, a pre-determined amount of printable material being used, a pre-determined amount of time having elapsed, a pre-determined number of drum rotations, or the imaging machine having performed a pre-determined number of cycles with the electronic circuit.

In an example, when the electronic circuit enters into communication with an imaging machine, the electronic circuit is married to the imaging machine when the imaging machine stores one of the circuit's identifiers in the imaging machine's memory and the information in the circuit is altered to put the circuit into a communicated state. The electronic circuit stays married to the imaging machine until a pre-determined event of the imaging cartridge printing 1,000 pages occurs. After the imaging cartridge prints 1,000 pages, the electronic circuit transforms itself to a non-communicated state and alters its identifier. In another example, every time the pre-determined event of the electronic circuit powering down occurs, the electronic circuit transforms itself to a non-communicated state and alters its identifier. Any pre-determined event is envisioned for the invention including triggering the circuit each time the electronic circuit powers down, after the circuit has powered down a pre-determined amount of times, or after the electronic circuit has powered down for a pre-determined length of time. Also, FIG. 5 shows the circuit transforming itself to a non-communicated state and also transforming itself by changing its identifier, however certain situations may arise it desired for the circuit to only perform one of these steps.

Figure 6:
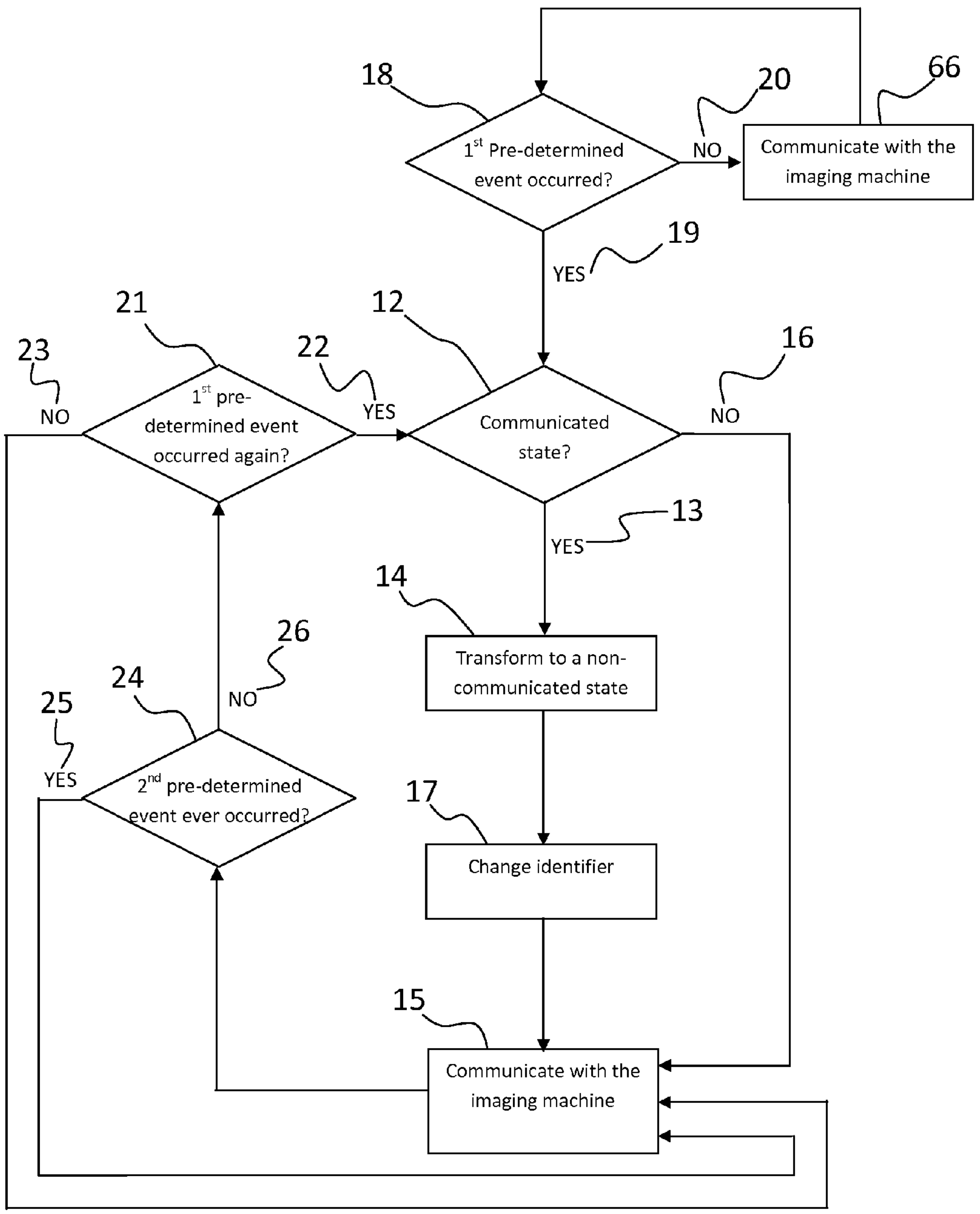
FIG. 6 is a flow chart describing a procedure in which the electronic circuit performs the procedure of FIG. 5 until a second pre-determined event occurs.

FIG. 6 shows another method of the preferred embodiment where the electronic circuit continues to perform the method in FIG. 5 until a second pre-determined event occurs that triggers the electronic circuit to cease un-marrying the imaging machine. The electronic circuit determines if a second pre-determined event has occurred 24. If a second pre-determined event has occurred 25, then the electronic circuit simply undergoes standard communications with the imaging machine 15, and no longer un-marries the imaging machine. Therefore, after the second pre-determined event occurs, if the electronic circuit becomes married to the imaging machine, the electronic circuit will not un-marry itself from the imaging machine. However, if the second pre-determined event has not occurred 26, then the electronic circuit continues to perform the method of FIG. 5 to un-marry the imaging machine every time the first pre-determined event occurs.

In yet another example, the electronic circuit continues to change its identifier and transform itself to a non-communicated state every time the first pre-determined event of the electronic circuit powering up occurs, but after the second pre-determined event of the imaging cartridge printing 1,000 page occurs, the electronic circuit ceases to change its identifier and transform itself to a non-communicated state any longer. Therefore, after the imaging cartridge has printed 1,000 pages, if the electronic circuit becomes married to an imaging machine, the circuit will stay married to the imaging machine.

Although FIG. 6 shows only two predetermined events, any number of pre-determined events are envisioned by the present invention. The electronic circuit can be triggered to transform itself or cease to transform itself any number of times.

Additionally, the second pre-determined event can be related to the first pre-determined event. For example, the circuit is triggered every time the circuit powers down, until the circuit has powered down a pre-determined number of times, then the circuit ceases to be triggered any longer.

Although step 12 of FIGS. 2-6 checks to see if the electronic circuit is in a communicated state, this step could instead check to see if the see if the electronic circuit is in any altered state. Additionally, instead of step 14 transforming the circuit to a non-communicated state, this step could transform the circuit to any previous state or any other state that allows the circuit to be accepted by the imaging machine.

Figure 7:
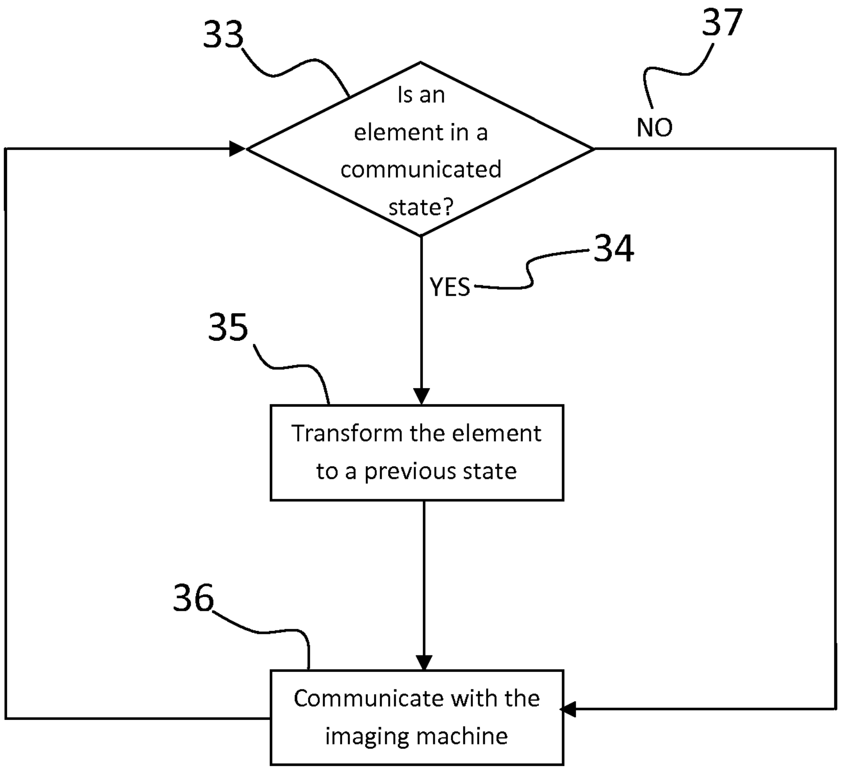
FIG. 7 is a flow chart describing a procedure in which the electronic circuit transforms an element of itself to a previous state.

FIG. 7 shows a method of the preferred embodiment in which the electronic circuit transforms an element of itself to a previous state. First, the electronic circuit determines if an element of itself has been altered from its original state to a communicated state 33. If an element of the electronic circuit is in a communicated state 34, the electronic circuit transforms itself to a previous state 35, so that the imaging machine will recognize the electronic circuit as being in a previous state. The electronic circuit then undergoes standard communications with the imaging machine 36. If an element of the electronic circuit is not in a communicated state 37, the electronic circuit simply undergoes standard communications with the imaging machine 36.

In an example, the element of the electronic circuit associated with the printable material indicator reads that the cartridge is 100 percent full of printable material when the electronic circuit first enters into communication with the imaging machine, but after operation now reads that only 75 percent of the printable material remains in the cartridge. At this point, the imaging machine recognizes that the element is in a communicated state. Thus the electronic circuit transforms the element to a previous state by altering the value of the printable material indicator to no longer read 75 percent full, but rather 100 percent full, so the imaging machine does not recognize that any printable material has been used. In this example, the printable material indicator doesn't have to be altered to read 100 full. Any value which is a previous state or any value that the imaging machine will recognize the circuit as being in a non-communicated state is envisioned.

Figure 8:
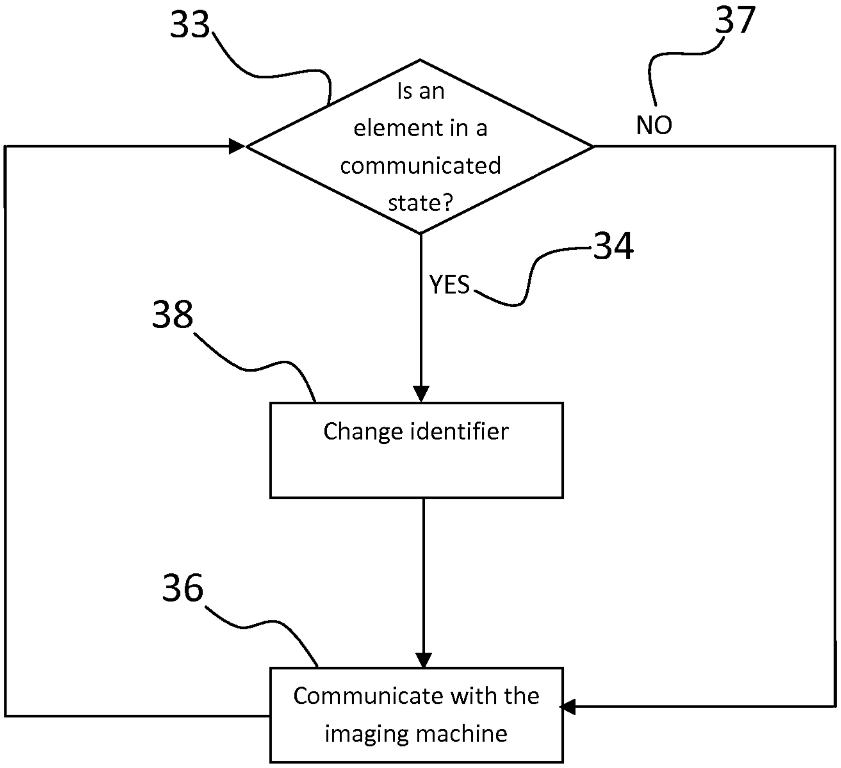
FIG. 8 is a flow chart describing a procedure in which the electronic circuit transforms itself by changing its identifier.

FIG. 8 shows another method of the preferred embodiment in which the electronic circuit changes its identifier to keep the imaging machine from rejecting the circuit. In this embodiment, the electronic circuit first determines if an element of itself has been altered from its original state to a communicated state 33. If the electronic circuit is in a communicated state 34, the electronic circuit changes its identifier 38, so that the imaging machine will not recognize the electronic circuit as being a circuit with which the imaging machine has previously communicated, and therefore will not reject the circuit. The electronic circuit then undergoes standard communications with the imaging machine 36. If an element of the electronic circuit is not in a communicated state 37, the electronic circuit simply undergoes standard communications with the imaging machine 36.

In an example, a first electronic circuit is used on a first imaging cartridge containing standard toner. When a bank prints a document with the first cartridge, the imaging machine alters a first element of the first circuit to indicate that the first element is in a communicated state and the imaging machine also stores an identifier of the first circuit. Next, the bank uses a second cartridge containing MICR toner to print a check in the same imaging machine and the imaging machine stores an identifier of the second circuit in the most recent position in the imaging machine's memory. Thus, in order to be used in the imaging machine again, the first electronic circuit transforms itself by changing its identifier. Because the new identifier of the first circuit is not stored in an old position in the imaging machine's memory, the imaging machine will not recognize that it has previously communicated with the first circuit and will accept the first circuit.

Figure 9:
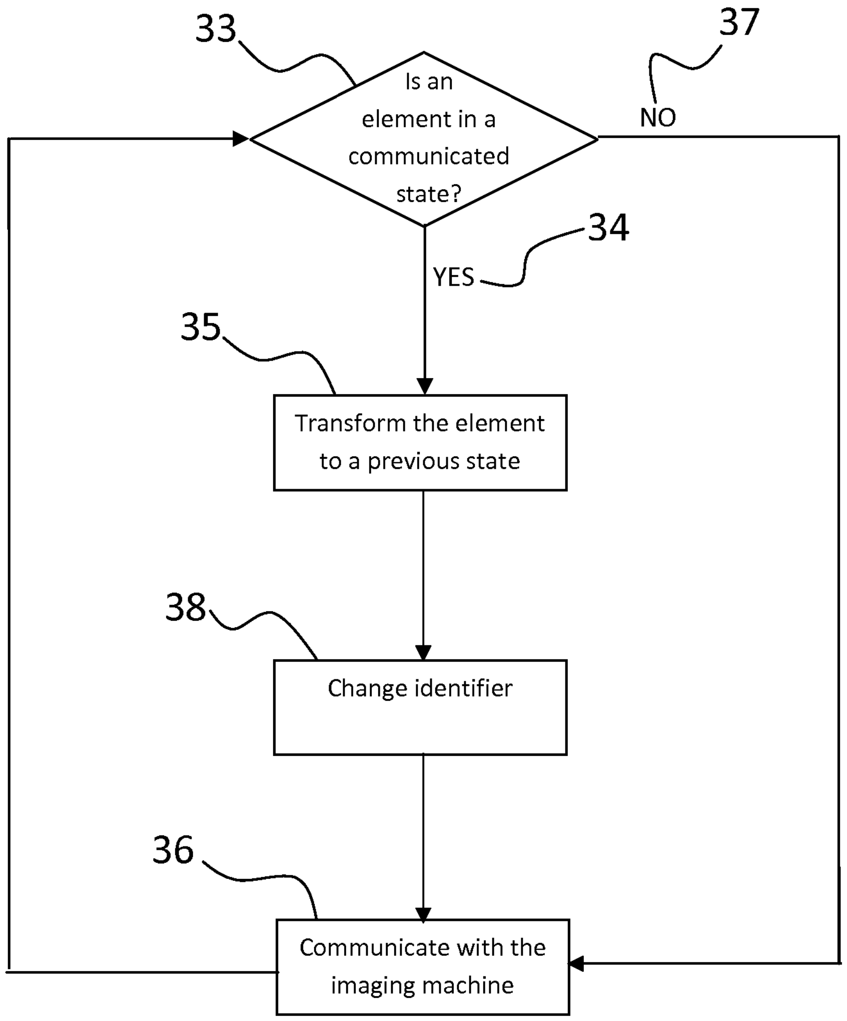
FIG. 9 is a flow chart describing a procedure in which the electronic circuit both transforms an element of itself to a previous state and changes its identifier.

FIG. 9 shows another method of the preferred embodiment, in which the electronic circuit is able to extend its life. After the electronic circuit determines that an element of itself is in a communicated state 34, the electronic circuit transforms itself to a previous state 35 and also transforms itself by changing its identifier 38. Once the electronic circuit has transformed itself to a previous state and has also changed its identifier, the imaging machine will recognize the electronic circuit as a different, non-communicated, circuit and will begin operating with the circuit as such. However, since an element of the electronic circuit has been transformed to a previous state, a portion of the usable life of the element has been recovered, and thus the life of the element has been extended beyond its initial extent.

This embodiment allows the follow scenario:

1) a first electronic circuit is used with a MICR imaging cartridge to communicate with a first imaging machine to print checks in the first imaging machine;
2) the first electronic circuit is married to the first imaging machine by having an element of the circuit altered into a communicated state and having an identifier of the circuit stored in the most recent position in the identifier list in the first imaging machine's memory;
3) a second electronic circuit is then used with a standard imaging cartridge to communicate with the first imaging machine to print standard documents in the first imaging machine;
4) an identifier of the second circuit is stored in the most recent position in the identifier list in the first imaging machine's memory, and the first circuit's identifier is moved to the second most recent position on the identifier list in the first imaging machine's memory;
5) the first electronic circuit un-marries the first imaging machine by transforming the communicated element to be in a previous, non-communicated, state so that the first circuit can be used to print checks in a second imaging machine;
6) the first electronic circuit is married to the second imaging machine by having an element of the circuit altered into a communicated state and having an identifier of the circuit stored in the second imaging machine's memory;
7) The first electronic circuit un-marries the second imaging machine by transforming the communicated element into a previous, non-communicated, state; and
8) the first electronic circuit transforms itself to again be accepted by the first imaging machine by changing its identifier so that the first imaging machine recognizes the first electronic circuit as being a different circuit with which the first imaging machine has never communicated.

This embodiment also facilitates another scenario in which an electronic circuit exists with an element associated with the page count being in a non-communicated state. The element has a pre-determined usable life of 30,000 pages. When the electronic circuit enters into communication with an imaging machine, the imaging machine recognizes the initial pre-determined usable life for the page count to be 30,000 pages. The imaging machine also stores an identifier of the circuit. As the imaging cartridge prints pages, the imaging machine alters the element to indicate the pages that have been printed; therefore, after the imaging cartridge prints 10,000 pages, the imaging machine has altered the element of the circuit to indicate that the cartridge has printed 10,000 pages. At this point, the imaging machine recognizes the electronic circuit as being in a communicated state and also that 10,000 pages of the circuit's initial pre-determined useable life for the page count have been consumed. In order to extend the life of the page count beyond the initial extent of 30,000 pages, the electronic circuit transforms the element to a previous state that indicates that 0 pages have been printed and also changes its identifier. Therefore, the imaging machine recognizes the circuit as being a non-communicated circuit with which the machine has never previously communicated. Thus, the imaging machine will allow the circuit to print another 30,000 pages before rejecting the circuit as having reached the end of its life for the page count. This method allows the circuit to achieve an actual life of the page count (40,000 pages) that exceeds the initial pre-determined life of the page count (30,000 pages). Additionally, the page count doesn't have to be altered to indicate that 0 pages have been printed. Any value which is a previous state or any value that the imaging machine will recognize the circuit as being in a non-communicated state is envisioned.

Figure 10:
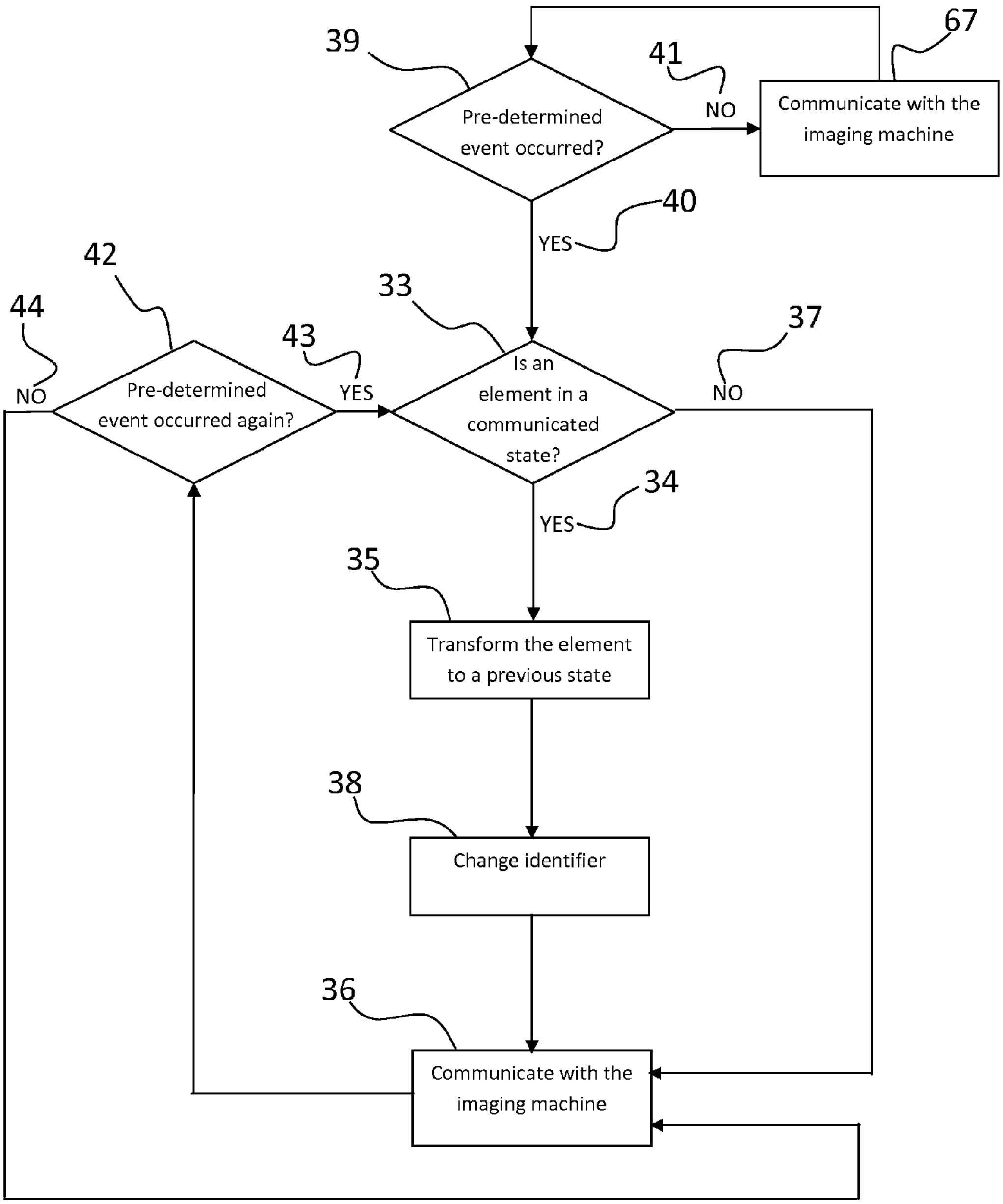
FIG. 10 is a flow chart describing a procedure in which the electronic circuit both transforms an element of itself to a previous state and changes its identifier after a pre-determined event occurs.

FIG. 10 shows another method of the preferred embodiment where the electronic circuit is triggered to perform the method of FIG. 9 after a pre-determined event occurs. First, the electronic circuit determines if a pre-determined event has occurred 39. If a pre-determined event has occurred 40, then the electronic circuit performs the method in FIG. 9. If a pre-determined event has not occurred 41, then the electronic circuit simply undergoes standard communications with the imaging machine 67.

The electronic circuit keeps checking to see if the pre-determined event occurs again 42. If the predetermined event occurs again 43, then the electronic circuit performs the method in FIG. 9. If the pre-determined event has not occurred again 44, then the electronic circuit simply undergoes standard communications with the imaging machine 36.

Figure 11:
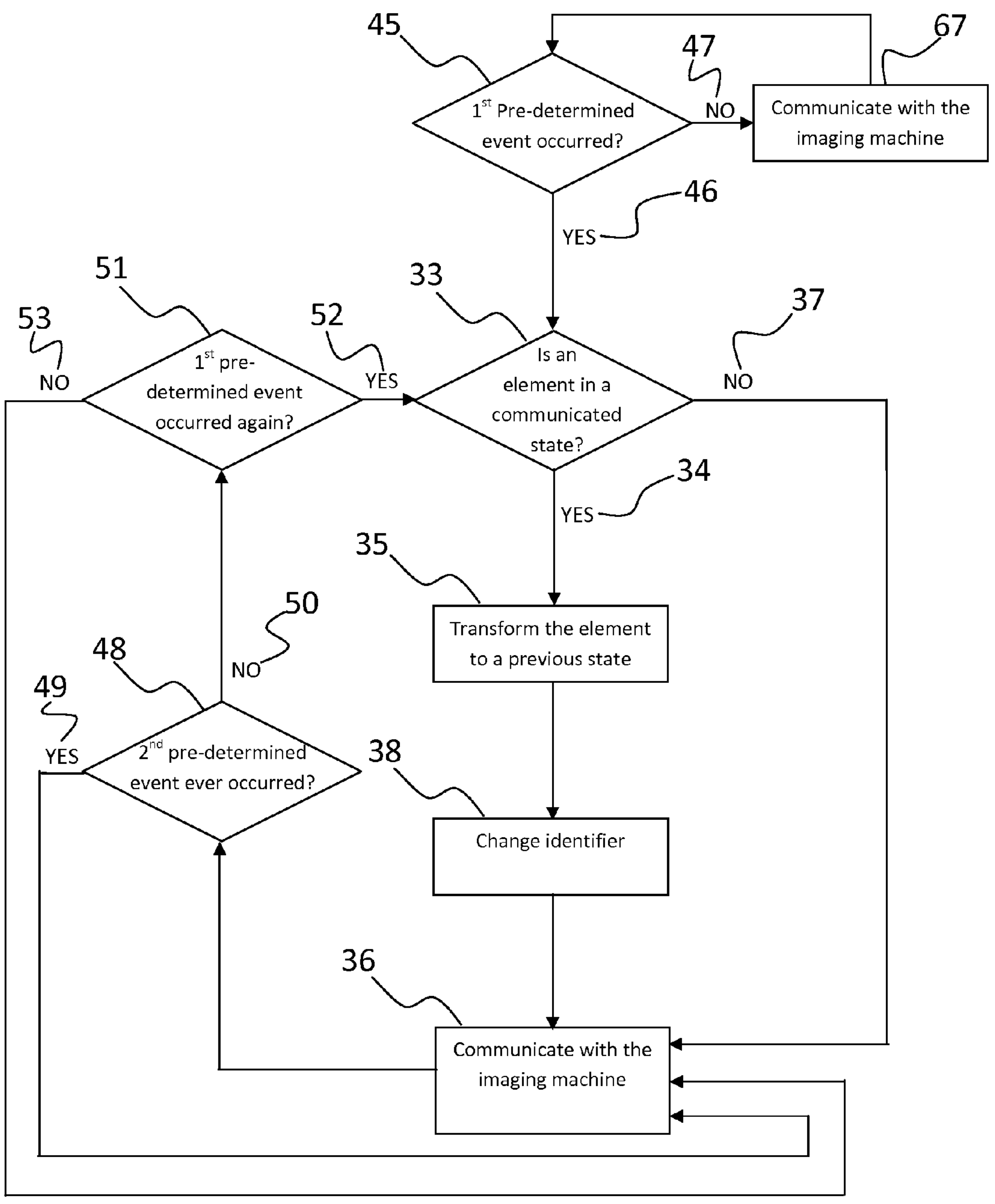
FIG. 11 is a flow chart describing a procedure in which the electronic circuit performs the procedure of FIG. 10 until a second pre-determined event occurs.

FIG. 11 shows another method of the preferred embodiment where the electronic circuit continues to perform the method in FIG. 10 until a second pre-determined event occurs that triggers the electronic circuit to cease performing the method of FIG. 10. The electronic circuit determines if a second pre-determined event has occurred 48. If a second pre-determined event has occurred 49, then the electronic circuit simply undergoes standard communications with the imaging machine 36, and no longer performs the method of FIG. 10. Therefore, after the second pre-determined event occurs, if an element of the electronic circuit becomes altered, the electronic circuit will not transform the element to a previous state or change the identifier of the circuit. However, if the second pre-determined event has not occurred 50, then the electronic circuit continues to perform the method of FIG. 10 every time the first pre-determined event occurs.

Although step 33 of FIGS. 7-11 checks to see if the element of the electronic circuit is in a communicated state, this step could instead check to see if the see if the element is in any altered state. Additionally, instead of step 35 transforming the element to a previous state, this step could transform the element to a non-communicated state, or any other state that allows the circuit to be accepted by the imaging machine.

Figure 12:
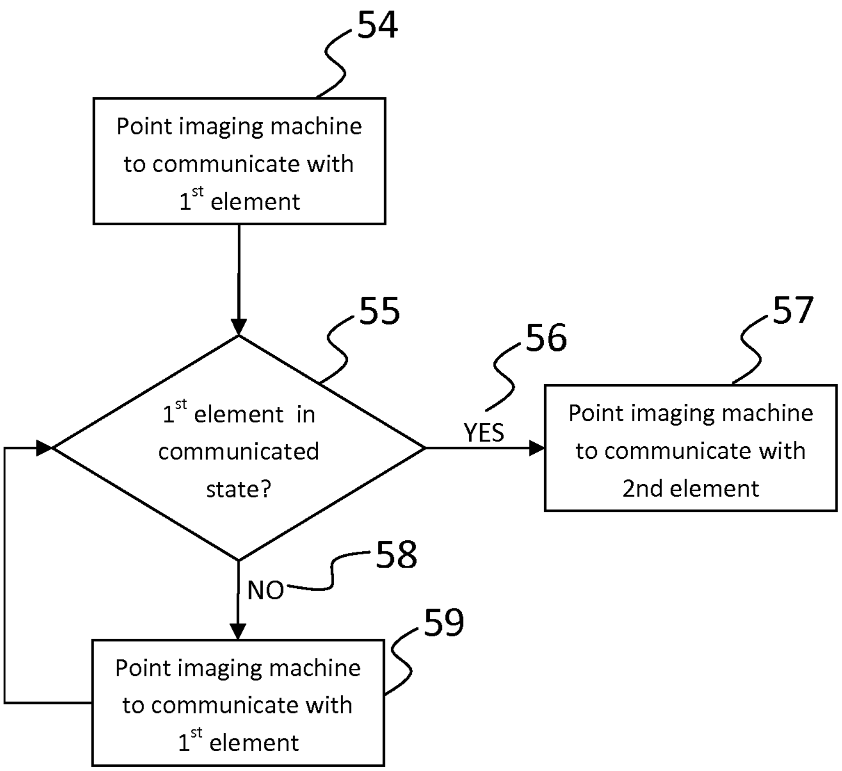
FIG. 12 is a flow chart describing a procedure in which the electronic circuit determines whether to point the imaging machine to communicate with a first or second element.

FIG. 12 shows a method of the preferred embodiment in which the electronic circuit has a first and a second element. The electronic circuit first points the imaging machine to communicate with a first element, and then points the imaging machine to communicate with a second element after the first element has been altered from its original state to a communicated state. During interoperation between the electronic circuit and the imaging machine, the electronic circuit initially points the imaging machine to communicate with the first element 54. Then the electronic circuit determines if the first element is in a communicated state 55. If the first element is not in a communicated state 58, then the electronic circuit continues to point the imaging machine to communicate with the first element 59. This process repeats until the electronic circuit determines that the first element has been altered to be in a communicated state 56. Once the electronic circuit has determined that the first element is in a communicated state, the electronic circuit points the imaging machine to communicate with the second element 57.

There are many manners in which the first element can be altered to a communicated state. One manner is for the imaging machine to alter the first element from its original state to indicate that the first element is in a communicated state. The first element's original state is the state that it is in once the electronic circuit has been programmed with information, but before it has ever communicated with any imaging machine. Once the first element is altered to indicate that it is in a communicated state, the imaging machine is able to recognize the first element as being in a communicated state and therefore recognizes the electronic circuit as being in a communicated state. In order to make the imaging machine recognize the electronic circuit as being in a non-communicated state, the electronic circuit stops pointing the imaging machine to communicate with the first element, and instead points the imaging machine to communicate with the second element 57 (the second element relating to the same cartridge characteristic as the first element, but being in a non-communicated state) so the imaging machine recognizes the electronic circuit as being in a non-communicated state.

The above embodiment allows an electronic circuit that has been put into a communicated state to transform itself to be in a non-communicated state. In an example, an electronic circuit comprises a first and a second element, the first element being associated with a first printable material indicator and the second element being associated with a second printable material indicator, the printable material indicators indicating the amount of printable material remaining in the imaging cartridge. The first and second printable material indicators exist in their original states which indicate that the imaging cartridge has a full amount of printable material remaining. When the electronic circuit is entered into communication with the imaging machine, the circuit points the imaging machine to communicate with the first element in order to receive information regarding the amount of printable material remaining in the imaging cartridge. Once the imaging cartridge prints, the first printable material indicator in the first element is altered to indicate that a portion of the printable material has been used. As a result, the imaging machine is able to recognize that the first printable material indicator in the first element has been altered and therefore recognizes the electronic circuit as being in a communicated state.

Once the electronic circuit recognizes that the first element has been altered, the electronic circuit no longer points the imaging machine to the first element to receive information regarding the amount of printable material remaining in the imaging cartridge, and instead points the imaging machine to the second element (the printable material indicator in the second element still being in its original state). Because the second element is still in its original state, the imaging machine recognizes the electronic circuit as indicating that the imaging cartridge has a full amount of printable material remaining, and thus the imaging machine recognizes the electronic circuit as being in a non-communicated state. This method allows the electronic circuit to transform itself from a communicated state to a non-communicated state.

The above embodiment is useful because in some instances, once the first element of the electronic circuit has been placed into an altered state, the imaging machine will no longer accept the electronic circuit. In order to make the imaging machine accept the electronic circuit once again, the electronic circuit stops pointing the imaging machine to communicate with the first element, and instead points the imaging machine to communicate with the second element (the second element being in a state where the imaging machine will accept the electronic circuit).

In another example the electronic circuit contains information that initially allows the circuit to be accepted by a first and a second imaging machine. The electronic circuit comprises a first and a second element, both elements being associated with the drum rotation count of the imaging cartridge. When the electronic circuit is entered into communication with the first imaging machine, the first imaging machine stores an identifier of the circuit in the first imaging machine's memory. During interoperation between the electronic circuit and the first imaging machine, the circuit points the first imaging machine to communicate with the first element in order to receive information regarding the number of rotations the photoconductive drum has performed. Once the imaging cartridge prints, the drum rotation count indicator in the first element is altered to indicate that the drum has performed rotations, which indicates that the electronic circuit is in a communicated state. Once the electronic circuit is in a communicated state and the first imaging machine has stored an identifier of the circuit in the first imaging machine's memory, the electronic circuit is married to the first imaging machine. Therefore, if the electronic circuit is removed from communication with the first imaging machine and entered into communication with the second imaging machine, the second imaging machine will recognize that the electronic circuit is in a communicated state and the identifier of the circuit is not stored in the most recent position in the second imaging machine's memory and thus the second imaging machine will reject the circuit.

To un-marry the electronic circuit from the first imaging machine, and allow the electronic circuit to be accepted by the second imaging machine, when the electronic circuit is entered into communication with the second imaging machine, the electronic circuit points the second imaging machine to communicate with the second element (the second element being in a non-communicated state). Therefore, the second imaging machine recognizes the electronic circuit as being in a non-communicated state and the second imaging machine will accept the electronic circuit and will store an identifier of the circuit in the second imaging machine's memory.

In some instances, the first element of the electronic circuit is altered to indicate that a portion of the electronic circuit's pre-determined usable life for a characteristic has been depleted. The initial extent of the pre-determined life of the characteristic associated with the first element was communicated to the imaging machine when the electronic circuit was pointed to communicate with the first element 54. In order to extend the actual life that the characteristic is allowed to achieve, instead of pointing the electronic circuit to communicate with the first element to receive information regarding the status of the characteristic, the electronic circuit points the imaging machine to communicate with the second element (the second element having a larger remaining extent for the pre-determined life of the characteristic than the first element). Therefore, when the imaging machine is pointed to communicate with the second element, the imaging machine recognizes the characteristic as having more life remaining than was indicated by the first element. As a result, the electronic circuit is able to achieve an actual life for the characteristic with a greater extent than the initial pre-determined usable life. In this example, the first and second elements can have pre-determined usable lives having the same extent (both elements allow 30,000 pages to be printed) or different extents (the first element allows 3,000 pages to be printed and the second element allows 6,000 pages to be printed).

In another example, the electronic circuit comprises a first and a second element, both elements being associated with the page count of the imaging cartridge. The imaging machine requires that the electronic circuit must set a pre-determined usable life for the page count of the cartridge at 30,000 pages. Therefore, the pre-determined usable life of each element is set to allow 30,000 pages. When the electronic circuit enters into communication with the imaging machine, the circuit points the imaging machine to communicate with the first element in order for the imaging machine to receive information regarding the page count of the cartridge. Once the imaging machine communicates with the first element, the imaging machine recognizes that the first element has set a pre-determined life for the page count at an extent of 30,000 pages. Thus the imaging machine recognizes the electronic circuit's initial extent of the pre-determined life of the page count to be 30,000 pages.

As the cartridge prints, the first element is altered to keep track of the page count of the cartridge by indicating the number of pages the cartridge has printed. Each page that the cartridge prints depletes the pre-determined useable life of the page count stored in the first element. After the imaging cartridge has printed 25,000 pages, the first element is altered to indicate that 25,000 pages of the pre-determined usable life of the page count have been depleted. Therefore the imaging cartridge is only allowed to print 5,000 more pages before the electronic circuit indicates that the pre-determined usable life has been completely depleted and the imaging machine rejects the electronic circuit. However, the second element of the electronic circuit has not been depleting its page count, so the second element will still allow the cartridge to print another 30,000 pages.

Now that the first element has depleted its page count by 25,000 pages, in order to extend the actual life of the electronic circuit, the circuit stops pointing the imaging machine to communicate with the first element to receive information regarding page count, and instead points the imaging machine to communicate with the second element. Since the second element still has an available pre-determined usable life of 30,000 pages, the imaging cartridge is allowed to print another 30,000 pages, bringing the total actual life that the electronic circuit achieves to 55,000 pages. This greatly exceeds the initial pre-determined usable life of 30,000 pages.

Additionally, the imaging machine often stores an identifier of the electronic circuit in its memory along with the present status of each of the characteristics. Therefore, when the electronic circuit points the imaging machine to communicate with the second element and thus the imaging machine receives status information that is inconsistent from the information that the imaging machine had received from the first element, the imaging machine believes that the imaging cartridge has been refilled and will reject the circuit. In these cases, when the electronic circuit points the imaging machine to communicate with the second element, the circuit communicates a different identifier to the imaging machine so the imaging machine believes it is communicating with a different circuit and thus will accept the circuit. This can be done by having a second identifier in a different element of the circuit and pointing the imaging machine to communicate with the element that comprises the second identifier when the imaging machine requests the identifier of the circuit. It is also possible for the electronic circuit to simply change the value of its identifier.

Figure 13:
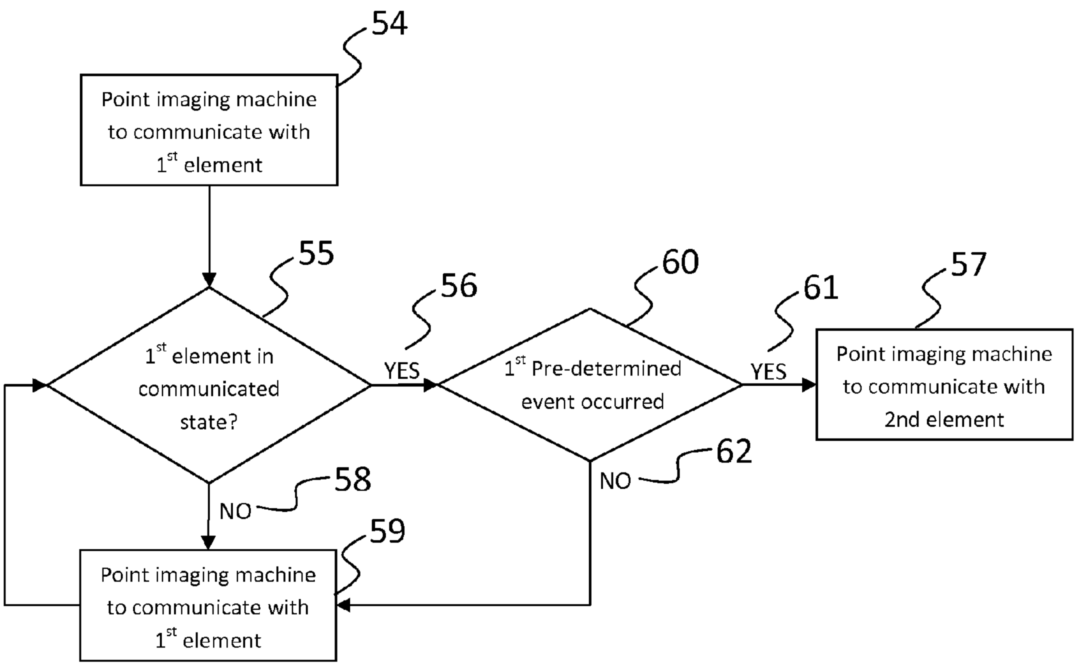
FIG. 13 is a flow chart describing a procedure in which the electronic circuit doesn't point the imaging machine to communicate with the second element until a pre-determined event occurs.

FIG. 13 shows another method of the preferred embodiment where the electronic circuit waits until a pre-determined event occurs before it is triggered to point the imaging machine to communicate with the second element. In this method, the electronic circuit initially points the imaging machine to communicate with the first element 54. Then the electronic circuit determines if the first element is in a communicated state 55. If the first element is in a communicated state 56, then the electronic circuit checks to see if a pre-determined event has occurred 60 before deciding whether to point the imaging machine to communicate with the first or second element. If the pre-determined event has occurred 61, then the electronic circuit points the imaging machine to communicate with the second element 57, however, if the pre-determined event has not occurred 62, then the circuit again points the imaging machine to communicate with the first element 59.

This embodiment allows the circuit to many multiple imaging machines. In an example, the electronic circuit comprises a first element and a second element, both elements being in a non-communicated state, and also being related to the same characteristic of the imaging cartridge. Additionally, the first element has a first identifier with a first value, and the second element has a second identifier with a second value. When the electronic circuit enters into communication with a first imaging machine, the circuit points the first imaging machine to communicate with the first element, and then the first imaging machine marries the electronic circuit to the first imaging machine by altering the first element to indicate that the first element is in a communicated state and storing the identifier from the first element in the first imaging machine's memory. Then, once a pre-determined event (of the electronic circuit being removed from communication with the first imaging machine and entered into communication with the second imaging machine) has occurred, the circuit points the second imaging machine to communicate with the second element, and then the second imaging machine marries the electronic circuit to the second imaging machine by altering the second element to indicate that the second element is in a communicated state and storing the identifier from the second element in the second imaging machine's memory. Therefore, the first element indicates that the electronic circuit is married to the first imaging machine and un-married to the second imaging machine, and the second element indicates that the electronic circuit is married to the second imaging machine and un-married to the first imaging machine. This allows the circuit to be tested in a first imaging machine and then marry the first imaging machine, and then later be used by an end-user in a second imaging machine, and also marry the end-user's second imaging machine.

Figure 14:
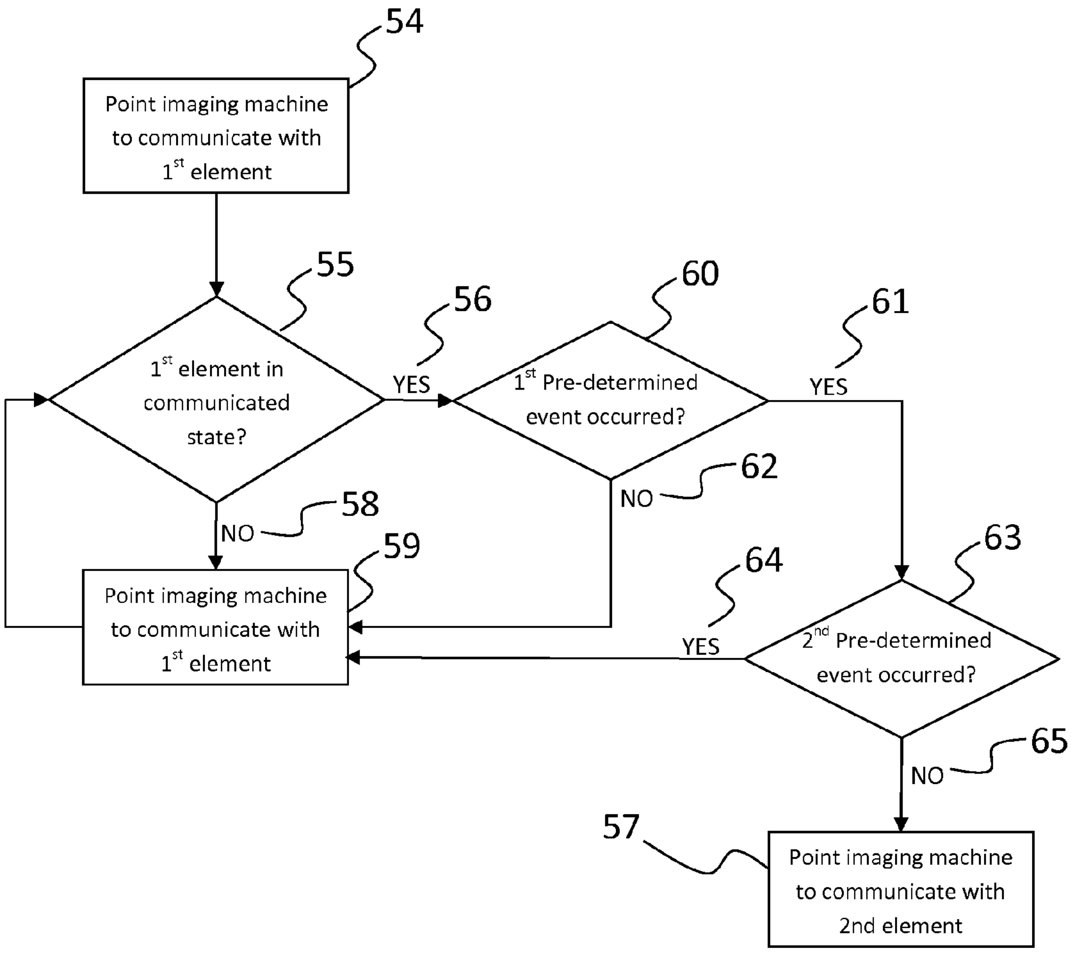
FIG. 14 is a flow chart describing a procedure in which the electronic circuit doesn't point the imaging machine to communicate with the second element after a second pre-determined event occurs.

FIG. 14 shows another method of the preferred embodiment where the electronic circuit will not point the imaging machine to communicate with the second element after a second pre-determined event occurs. In this method, the electronic circuit initially points the imaging machine to communicate with the first element 54. Then the electronic circuit determines if the first element is in a communicated state 55. If the first element is in a communicated state 56, then the electronic circuit checks to see if a pre-determined event has occurred 60 before deciding whether to point the imaging machine to communicate with the first or second element. If the pre-determined event has occurred 61, then the electronic circuit determines if a second pre-determined event has occurred 63. If the second pre-determined event has not occurred 65, then the electronic circuit points the imaging machine to communicate with the second element. However, if the second pre-determined event has occurred 64, then the electronic circuit points the imaging machine to communicate with the first element.

Although step 55 of FIGS. 12-14 checks to see if the first element is in a communicated state, this step could instead check to see if the see if the electronic circuit is in any altered state.

It will thus be seen that the objects set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

Now that the invention has been described,

What is claimed is:

1. A method of operating an electronic circuit adapted to communicate with an imaging machine, said method comprising the steps of:

said electronic circuit comprising a first element and a second element;

said first element being in a state which would indicate to said imaging machine that said electronic circuit had previously communicated with any imaging machine;

said second element being in a state which would indicate to said imaging machine that said electronic circuit had not previously communicated with any imaging machine;

pointing said imaging machine to communicate with said second element, such that said imaging machine recognizes said electronic circuit as not having previously communicated with any imaging machine.

2. The method of claim 1, further comprising:

said electronic circuit pointing said imaging machine to communicate with said second element after a pre-determined event has occurred; said predetermined event being an imaging cartridge with which said electronic circuit is associated having printed a predetermined number of pages.

3. The method of claim 1, further comprising the step of:

said electronic circuit pointing said imaging machine to communicate with said second element after a predetermined event has occurred.

4. The method of claim 3, further comprising said predetermined event being:

said electronic circuit entering sleep mode, said electronic circuit waking from sleep mode, said electronic circuit reaching a pre-determined temperature, said electronic circuit communicating with a pre-determined number of imaging machines, a pre-determined amount of time having elapsed, a pre-determined number of drum rotations, or said imaging machine having performed a pre-determined number of cycles with said electronic circuit.

5. The method of claim 1, further comprising:

a predetermined event triggering said electronic circuit to never again transform itself.

6. The method of claim 5, further comprising said predetermined event being:

said electronic circuit having transformed itself to a non-communicated state a pre-determined number of times, said electronic circuit powering up, said electronic circuit entering sleep mode, said electronic circuit waking from sleep mode, said electronic circuit reaching a pre-determined temperature, said electronic circuit communicating with a pre-determined number of imaging machines, a pre-determined amount of time having elapsed, a pre-determined number of drum rotations, or said imaging machine having performed a pre-determined number of cycles with said electronic circuit.

7. The method of claim 5 further comprising said predetermined event being:

a predetermined amount of printable material being dispensed.

8. The method of claim 5, further comprising said predetermined event being:

an imaging cartridge with which said electronic circuit is associated having printed a predetermined number of pages.

9. The method of claim 5, further comprising said predetermined event being:

said electronic circuit powering down.

10. The method of claim 3, further comprising said pre-determined event being:

said electronic circuit powering down.

11. The method of claim 3, further comprising said pre-determined event being:

a pre-determined amount of printable material being dispensed.

12. The method of claim 3, further comprising said pre-determined event being:

said electronic circuit powering up.

13. A method of operating an electronic circuit adapted to communicate with an imaging machine, said method comprising the steps of:

said electronic circuit transforming itself to a state in which said imaging machine would recognize said electronic circuit as not having previously communicated with any imaging machines, from a state in which said imaging machine would have recognized said electronic circuit as having previously communicated with any imaging machines;

said electronic circuit transforming itself after a predetermined event has occurred;

said predetermined event being: said electronic circuit powering down.

14. A method of operating an electronic circuit adapted to communicate with an imaging machine, said method comprising the steps of:

said electronic circuit transforming itself to a state in which said imaging machine would recognize said electronic circuit as not having previously communicated with any imaging machines, from a state in which said imaging machine would have recognized said electronic circuit as having previously communicated with any imaging machines;

said electronic circuit transforming itself after a predetermined event has occurred;

said predetermined event being: an imaging cartridge with which said electronic circuit is associated having printed a predetermined number of pages.

15. A method of operating an electronic circuit adapted to communicate with an imaging machine, said method comprising the steps of:

said electronic circuit transforming itself to a state in which said imaging machine would recognize said electronic circuit as not having previously communicated with any imaging machines, from a state in which said imaging machine would have recognized said electronic circuit as having previously communicated with any imaging machines;

a predetermined event triggering said electronic circuit to never again transform itself;

said pre-determined event being: said electronic circuit powering down a pre-determined number of times.

16. A method of operating an electronic circuit adapted to communicate with an imaging machine, said method comprising the steps of:

after a first predetermined event, said electronic circuit transforming itself to a state in which said imaging machine would recognize said electronic circuit as not having previously communicated with any imaging machines, from a state in which said imaging machine would have recognized said electronic circuit as having previously communicated with any imaging machines;

a second predetermined event triggering said electronic circuit to never again transform itself;

said second pre-determined event being: said electronic circuit powering up a pre-determined number of times.

17. A method of operating an electronic circuit adapted to communicate with an imaging machine, said method comprising the steps of:

said electronic circuit transforming itself to a state in which said imaging machine would recognize said electronic circuit as not having previously communicated with any imaging machines, from a state in which said imaging machine would have recognized said electronic circuit as having previously communicated with any imaging machines;

a predetermined event triggering said electronic circuit to never again transform itself;

said pre-determined event being: an imaging cartridge with which said electronic circuit is associated having printed a predetermined number of pages.

18. A method of operating an electronic circuit adapted to communicate with an imaging machine, said method comprising the steps of:

said electronic circuit transforming itself to a state in which said imaging machine would recognize said electronic circuit as not having previously communicated with any imaging machines, from a state in which said imaging machine would have recognized said electronic circuit as having previously communicated with any imaging machines;

a predetermined event triggering said electronic circuit to never again transform itself;

said pre-determined event being: a pre-determined amount of printable material being dispensed.

19. A method of operating an electronic circuit adapted to communicate with an imaging machine, said method comprising the steps of:

said electronic circuit comprising a first identifier and a second identifier, said first and second identifiers adapted for communication between said electronic circuit and said imaging machine;

said first and second identifiers being of the same type;

said first identifier being stored in said imaging machine's memory, such that said imaging machine will conclude that any circuit that communicates said first identifier to said imaging machine has previously communicated with said imaging machine;

said second identifier not being stored in said imaging machine's memory, such that said imaging machine will conclude that any circuit that communicates said second identifier to said imaging machine has not previously communicated with said imaging machine;

communicating said second identifier to said imaging machine, such that said imaging machine concludes that said electronic circuit has not previously communicated with said imaging machine.

20. An electronic circuit adapted to communicate with an imaging machine, comprising:

a first identifier and a second identifier, said first and second identifiers adapted for communication between said electronic circuit and said imaging machine;

said first and second identifiers being of the same type;

said first identifier being stored in said imaging machine's memory, such that said imaging machine will conclude that any circuit that communicates said first identifier to said imaging machine has previously communicated with said imaging machine;

said second identifier not being stored in said imaging machine's memory, such that said imaging machine will conclude that any circuit that communicates said second identifier to said imaging machine has not previously communicated with said imaging machine;

said electronic circuit adapted to communicate said second identifier to said imaging machine, such that said imaging machine concludes that said electronic circuit has not previously communicated with said imaging machine.

21. An electronic circuit adapted to communicate with an imaging machine, comprising:

a first identifier and a second identifier, said first and second identifiers adapted for communication between said electronic circuit and said imaging machine;

said first and second identifiers being of the same type;

said imaging machine configured such that if said first identifier is stored in said imaging machine's memory said imaging machine will conclude that any electronic circuit that communicates said first identifier to said imaging machine has previously communicated with said imaging machine;

said imaging machine configured such that if said second identifier is not stored in said imaging machine's memory said imaging machine will not conclude that any electronic circuit that communicates said second identifier to said imaging machine has previously communicated with said imaging machine;

said electronic circuit adapted such that if said first identifier is stored in said imaging machine's memory, then said electronic circuit will communicate said second identifier to said imaging machine such that said imaging machine will not conclude that said electronic circuit has previously communicated with said imaging machine.

22. An electronic circuit adapted to communicate with an imaging machine, comprising:

a first identifier and a second identifier, said first and second identifiers adapted for communication between said electronic circuit and said imaging machine;

said first and second identifiers being of the same type;

said imaging machine configured such that if said second identifier is not stored in said imaging machine's memory said imaging machine will not conclude that any electronic circuit that communicates said second identifier to said imaging machine has previously communicated with said imaging machine;

said electronic circuit adapted such that if said first identifier is stored in said imaging machine's memory, then said electronic circuit will communicate said second identifier to said imaging machine such that said imaging machine will not conclude that said electronic circuit has previously communicated with said imaging machine.

* * * * *